United States Patent
Kuwahara et al.

(10) Patent No.: US 6,990,345 B2
(45) Date of Patent: Jan. 24, 2006

(54) METHOD AND APPARATUS FOR WIRELESS POSITION LOCATION

(75) Inventors: Mikio Kuwahara, Hachioji (JP); Kenzaburo Fujishima, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 360 days.

(21) Appl. No.: 10/345,162

(22) Filed: Jan. 16, 2003

(65) Prior Publication Data
US 2004/0072566 A1    Apr. 15, 2004

(30) Foreign Application Priority Data
Oct. 15, 2002   (JP) ............................. 2002-229794

(51) Int. Cl.
*H04Q 7/20* (2006.01)
(52) U.S. Cl. .................. 455/440; 455/70; 455/65; 455/67.1; 375/148; 375/267
(58) Field of Classification Search ............ 455/440, 455/70, 65, 67.1; 375/148, 267; 342/464, 342/453
See application file for complete search history.

(56) References Cited

U.S. PATENT DOCUMENTS

| | | | | |
|---|---|---|---|---|
| 6,121,927 A | * | 9/2000 | Kalliojarvi | .................. 342/453 |
| 2001/0028677 A1 | * | 10/2001 | Wang et al. | ................. 375/148 |
| 2002/0013130 A1 | * | 1/2002 | Kim et al. | ..................... 455/70 |
| 2002/0027957 A1 | * | 3/2002 | Paulraj et al. | .............. 375/267 |
| 2003/0043929 A1 | * | 3/2003 | Sampath | ...................... 375/267 |
| 2004/0207556 A1 | * | 10/2004 | Spilker et al. | .............. 342/464 |

FOREIGN PATENT DOCUMENTS

JP    7-181242    12/1993

OTHER PUBLICATIONS

U.S. Appl. No. 09/616,314, Jul. 17, 2000.
U.S. Appl. No. 09/639,745, Aug. 15, 2000.
U.S. Appl. No. 10/180,492, Jun. 27, 2002.

* cited by examiner

*Primary Examiner*—Sonny Trinh
*Assistant Examiner*—Phuoc Doan
(74) *Attorney, Agent, or Firm*—Reed Smith LLP; Stanley P. Fisher, Esq.; Juan Carlos A. Marquez, Esq.

(57) ABSTRACT

In a method for locating a position of a terminal with use of weak signals, a combined weight to be used to separate a path from others through correlation calculation is obtained from a plurality of delay profiles measured in course of time. The obtained weight is used to combine the delay profiles and a path detection is carried out on the combined delay profiles.

18 Claims, 15 Drawing Sheets

FIG. 13

- TWO WAVES

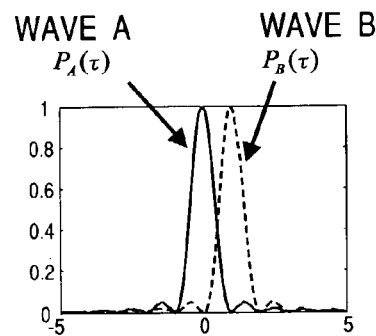

WAVE A $P_A(\tau)$   WAVE B $P_B(\tau)$

- DATA SAMPLING TIME
  (EACH WAVE TAKES INDEPENDENT PROPAGATION CHANNEL.)

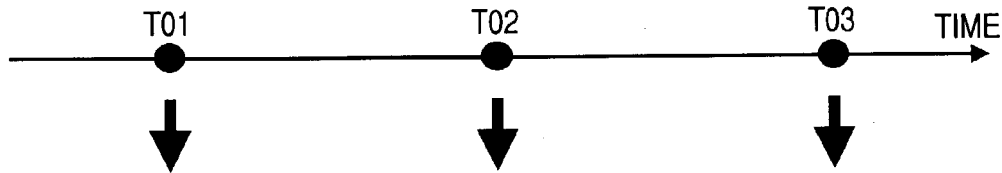

- OUTPUT OF THE CORRELATOR AT THE ABOVE DATA SAMPLING TIME

$P_1(\tau) = \vec{h}_{A1}P_A(\tau) + \vec{h}_{B1}P_B(\tau)$    $P_2(\tau) = \vec{h}_{A2}P_A(\tau) + \vec{h}_{B2}P_B(\tau)$    $P_3(\tau) = \vec{h}_{A3}P_A(\tau) + \vec{h}_{B3}P_B(\tau)$

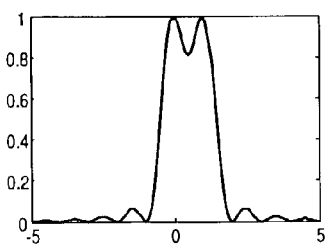 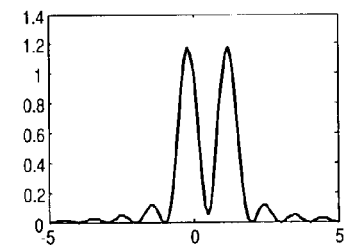 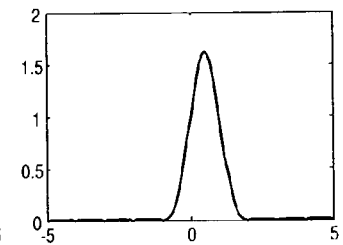

- OUTPUT OF THE INCOHERENT COMBINER

$|P_{incoherent}(\tau)|^2 = |P_1(\tau)|^2 + |P_2(\tau)|^2 + |P_3(\tau)|^2$

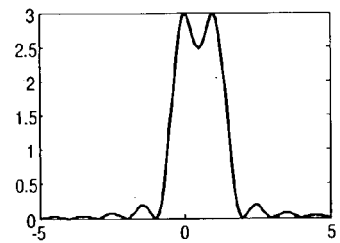

FIG. 14

■ TWO WAVES

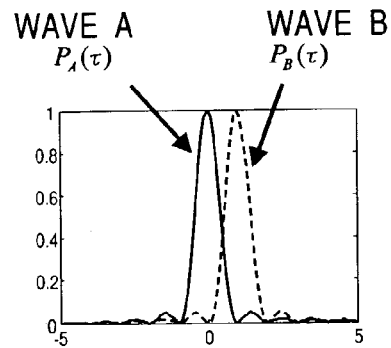

WAVE A $P_A(\tau)$     WAVE B $P_B(\tau)$

■ DATA SAMPLING TIME
(EACH WAVE TAKES INDEPENDENT PROPAGATION CHANNEL.)

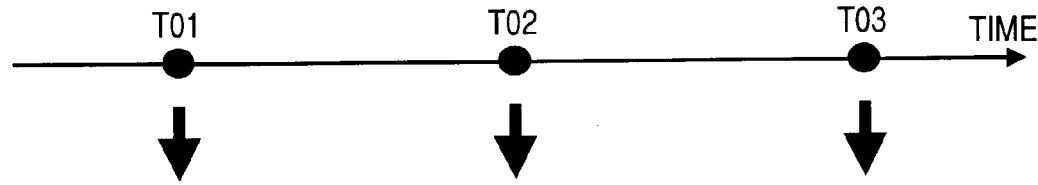

■ OUTPUT OF THE CORRELATOR AT THE ABOVE DATA SAMPLING TIME

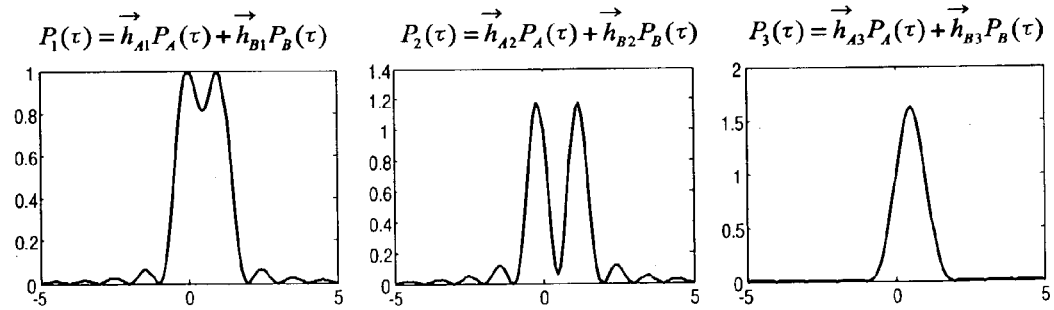

$P_1(\tau) = \vec{h}_{A1} P_A(\tau) + \vec{h}_{B1} P_B(\tau)$     $P_2(\tau) = \vec{h}_{A2} P_A(\tau) + \vec{h}_{B2} P_B(\tau)$     $P_3(\tau) = \vec{h}_{A3} P_A(\tau) + \vec{h}_{B3} P_B(\tau)$

■ OUTPUT OF THE MATCHED-WEIGHT-COMBINER

OUTPUT TO INTENSIFY WAVE A     OUTPUT TO INTENSIFY WAVE B $P_a(\tau) = \vec{h}^*_{A1} P_1(\tau) + \vec{h}^*_{A2} P_2(\tau) + \vec{h}^*_{A3} P_3(\tau)$     $P_b(\tau) = \vec{h}^*_{B1} P_1(\tau) + \vec{h}^*_{B2} P_2(\tau) + \vec{h}^*_{B3} P_3(\tau)$

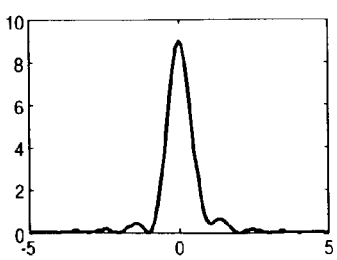 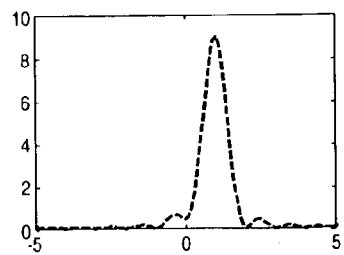

METHOD AND APPARATUS FOR WIRELESS POSITION LOCATION

BACKGROUND OF THE INVENTION

(1) Field of the Invention

The present invention relates to a method for locating positions of each wireless terminal with use of signals received from a plurality of radio wave transmitting sources. More particularly, the present invention relates to a method used by a system for locating a position of each of its wireless terminals with use of signals received from a plurality of cellular base stations.

(2) Description of Related Art

FIG. 12 shows a block diagram of a wireless terminal that employs a conventional technique. The principle of a trilateration method for detecting a position of such a wireless terminal with use of signals received from a plurality of wave transmitting sources according to the conventional technique is disclosed in the patent document 1.

At first, the configuration of the wireless terminal shown in FIG. 12 will be described with reference to the IS-95. The terminal comprises an antenna 1; an RF unit 2; a base band unit 3; a memory 7; and a CPU 8. Signals received by the antenna 1 are converted to base band signals by the RF unit 2.

Next, a procedure for locating a position of a terminal will be described. Each IS-95 base station transmits its pilot signal having a fixed pattern. The base station transmits each signal at a timing decided by its own unique PN offset so as to be delayed from the system clock. The terminal actuates its pilot signal correlator 6 to decide the nearest base station. The terminal then refers to all the phases of the pilot signal of the correlator 6 sequentially, to be correlated and find a timing at which the correlation peak is detected. The detected maximum correlation peak timing denotes a timing for synchronizing the terminal itself with the possibly nearest base station. The base band unit 3 includes a despreader 4 for control channel in itself and the despreader 4 performs a despreading operation at the timing of the detected nearest base station to despread a control channel signal from received base band signal. The despread control channel signal is detected by the receiver 5 and demodulated to valuable information therein. The CPU 8 takes out the ID of the subject base station from the detected information, then refers to the information tables of the near base stations to be observed, stored in the memory 7 beforehand to take out the PN offset of each of the near base stations. The terminal then generates complex delay profiles using the pilot signal correlator 6 with respect to the timing of each of the nearest and near base stations. Furthermore, the terminal converts the complex information to power delay profiles through sum-of-product operations. The generated power delay profiles are stored in the memory 7. The CPU 8 analyzes each delay profile stored in the memory 7 to take out a path-detected timing. The CPU 8 then locates the position of the terminal using such a solution method as the least squares method.

To receive signals from a plurality of base stations simultaneously, the terminal may be provided with a plurality of the pilot signal correlators 6. It is also possible to store received signals (snapshots) in the memory 7 once, then call the snapshots from the memory 7 sequentially by changing the PN offset in the correlator 6 and input them in the correlator 6. By repeating the procedure for generating delay profiles from the snapshots stored in this memory 7, delay profiles corresponding to a plurality of base stations can be generated from the same snapshot.

To receive signals at an apparatus for wireless position location effectively, for example, inside a house where only weak waves are received, it is recommended to receive data for a long time to detect such weak desired signals. Actually, however, it has been difficult to receive data for such a long time, since a phase rotation occurs in the pilot signal mainly due to the fading specific to wireless lines and/or a frequency shift to occur between the terminal oscillator and each base station oscillator. Hereunder, this conventional technique will be described with reference to FIG. 13. FIG. 13 shows incoherent combination, which is an object of the subject conventional technique. The incoherent combination means an operation for summing up power profiles converted from delay profiles obtained at different timings. The first step in FIG. 13 shows a received wave A and another received wave B delayed from the wave A. A position of a terminal is detected by measuring the receiving timing of the received signal that has a strong power and might be a direct wave (wave came through the line of-sight) or the preceding wave A that is or might be a direct wave. The second step in FIG. 13 shows a relationship between a time flow and information obtaining times. The horizontal axis in FIG. 13 denotes the time flow. For example, the data obtaining time differs between a signal received a T01 and a signal received at T02. Because each of the data obtaining times is an instantaneous one, each obtained information is referred to as a snapshot. The third step in FIG. 13 shows delay profiles generated from an obtained snapshot by the correlator 6 shown in FIG. 12. Although the output from the correlator 6 is a complex amplitude, it is denoted as incoherent-combined delay profiles converted from delay profiles so as to simplify the description.

In FIG. 13, signal waves A and B received at T01, T02, and T03 are affected by different fading levels or frequency shifts to occur between terminal and base station oscillators. The delay profiles in the third step in FIG. 13 thus change their shapes with time. After those delay profiles are combined incoherently, the fourth step shown in FIG. 13 is obtained. If delay profiles having a complex amplitude respectively are simply summed up before such the incoherent combination, their signal strengths will be cancelled by each other, since their signal vectors do not match, thereby their signals become weaker sometimes. Thus, receiving weak signals, which is an original object of the present invention, comes to be disabled.

The conventional problems described above will thus be summarized as follows; signals received in a long range cannot be used for coherent summation, because the complex amplitude of each delay profile changes mainly due to the fading and/or frequency shift to occur between terminal and base station oscillators.

SUMMARY OF THE INVENTION

The above conventional problem is solved, however, by a first method of the present invention for wireless position location. The method comprises step 1 of performing a correlation arithmetic operation between each of a plurality of snapshots and a specific signal to generate delay profiles corresponding to the plurality of snap shots; step 2 of combining a plurality of delay profiles obtained in step 1 with a weight; step 3 of detecting a target signal path timing from the combined signal delay profile; and step 4 of locating a position of a subject terminal from the plurality of detected path timings. To locate a position of a terminal with use of the principle of the trilateration method, at least three paths must be detected.

The above conventional problems can also be solved by a second method of the present invention for wireless position location. The second method is a variation of the above first method and the step 2 in the first method comes to include another step 5 in this second method. The step 5 obtains correlation matrixes of the plurality of delay profiles to calculate the above-described weight through the eigen analysis of each of the matrixes.

The above conventional problems can also be solved by the third method of the present invention for wireless position location. The third method is a variation of the above second method and the step 1 in the second method comes to include another step 6 to perform a correlation arithmetic operation for the specific signal. The step 6 generates a noise profile that uses a signal sequence that generates no correlation with any transmission signal. In addition, the step 5 in the above method comes to include steps 7 and 8 in this third method. The step 7 obtains a correlation matrix of the above noise profile to estimate a difference between the correlation matrix of the noise profile and that of each of the above delay profiles and the step 8 analyzes the eigen value of the difference between the correlation matrixes to select a weight used for a weighted combination from the plurality of obtained eigen vectors.

Furthermore, the above conventional problems are solved by the fourth method of the present invention for wireless position location. This fourth method is a variation of the above third method. The step 8 in the third method comes to be replaced with step 9 in this fourth method. The step 9 obtains the above-described weight by whiting the eigen vectors obtained through eigen analysis of each difference between correlation matrixes obtained in step 7 with use of the correlation matrix of the noise profile.

Furthermore, the above conventional problems are solved by the fifth method of the present invention for wireless position location. This fifth method is a variation of the above second method and the step 5 in this fifth method comes to include step 10 in this fifth embodiment. The step 10 combines delay profiles with a weight with respect to one or more eigen values and eigen vectors generated through eigen analysis to select an eigen vector having the maximum ratio between the maximum peak and the average noise level.

Furthermore, the above conventional problems are solved by the sixth method for wireless position location. The sixth method is a variation of the above fifth method. The step 1 in the fifth method comes to include another step 6 of generating a noise profile that uses a signal sequence that generates no correlation with any transmission signal in correlation with the above specific signal. In addition, the average noise level estimation in the step 10 uses a value obtained by averaging the noise profiles generated and weight-combined with the above eigen vector in step 6.

Furthermore, the above conventional problems are solved by the seventh method of the present invention for wireless position location. The seventh method comprises step 1 of performing a correlation arithmetic operation between each of a plurality of snapshots and a specific signal to generate delay profiles corresponding to the plurality of snap shots; step 2 of combining the plurality of delay profiles obtained in step 1 with a weight; step 3 of detecting a target signal path timing from the combined signal delay profiles; and step 4 of locating a position of a subject terminal from the plurality of detected path timings. In addition, this seventh method enables the receiving timings of snapshots to be adjusted so that snapshots are received at different timings according to the standard cycle T when a cycle T cycle signal is received and the relationship with a D period of receiving snapshot at a time becomes D<T. For example, receiving timings of snapshots are diffused so that the (L mod T) does not take a specific value with respect to any of the receiving timings L of snapshots. Thus, the effect of this method is achieved.

Furthermore, the above conventional problems are solved by the eighth method of the present invention for wireless position location. This eighth method is a variation of the above first method and the step 1 in the first method comes to include another step 11 in this eighth method. The step 11 selects a plurality of delay profiles from those obtained according to narrowness of observation time intervals to subject those delay profiles to the coherent summation that sums up them by adjusting the phase rotation of each delay profile.

Furthermore, the above conventional problems are solved by the ninth method of the present invention for wireless position location. This ninth method is a variation of the above first method. According to this ninth method, a plurality of base stations to be observed are divided into some groups to analyze the path timing of each of the groups upon performing of the steps 1 to 3 in the first method.

Furthermore, the above conventional problems are solved by the tenth method of the present invention for wireless position location. This tenth method is a variation of the above second method. The step 5 in the second method comes to include another step 12 in this tenth method. The step 12 performs a weighted combination for delay profiles using an eigen vector corresponding to the maximum eigen value. The vector is selected from a plurality of eigen values and eigen vectors obtained in the step 5. In a multi-path system, the earliest arrived wave path timing should preferably be used for the position location of a terminal. Thus, this tenth method improves such the accuracy more for locating a position of a terminal by selecting a combined delay profile that highlights the correlation at the earliest wave receiving timing.

Furthermore, the above conventional problems are solved by the eleventh method of the present invention for wireless position location. This twelfth method is a variation of the above third method. According to this eleventh method, a plurality of the noise profiles described above are generated so as to have a fixed length respectively and one correlation matrix is generated from the plurality of the noise profiles.

Furthermore, the above conventional problems are solved by the eleventh method of the present invention for wireless position location. This eleventh method is a variation of the above second method. The step 5 in the above second method comes to include another step 10 in this eleventh method. The step 10 combines delay profiles with a weight using eigen vectors with respect to one or more eigen values and eigen vectors generated through eigen analysis respectively and select one of the eigen vectors, which has the maximum ratio between the maximum peak and the average noise level.

Furthermore, the above conventional problems are solved by a first apparatus of the present invention for wireless position location. This first apparatus comprises a correlator for calculating a correlation result between a received radio signal and a specific signal in a specific section to generate delay profiles; memory means for storing the calculation result; combining means for combining stored delay profiles with a weight; path detecting means for detecting a path timing of a desired signal from the combined delay profiles; and position detecting means for locating a position of a target terminal according to the information.

BRIEF DESCRIPTION OF THE DRAWINGS

FIG. 13 is a diagram to explain a method for combining delay profiles according to a conventional technique.

FIG. 14 is a diagram to explain a method for combining delay profiles according to the invention.

DETAILED DESCRIPTION OF THE PREFERRED EMBODIMENTS

Figure 1:
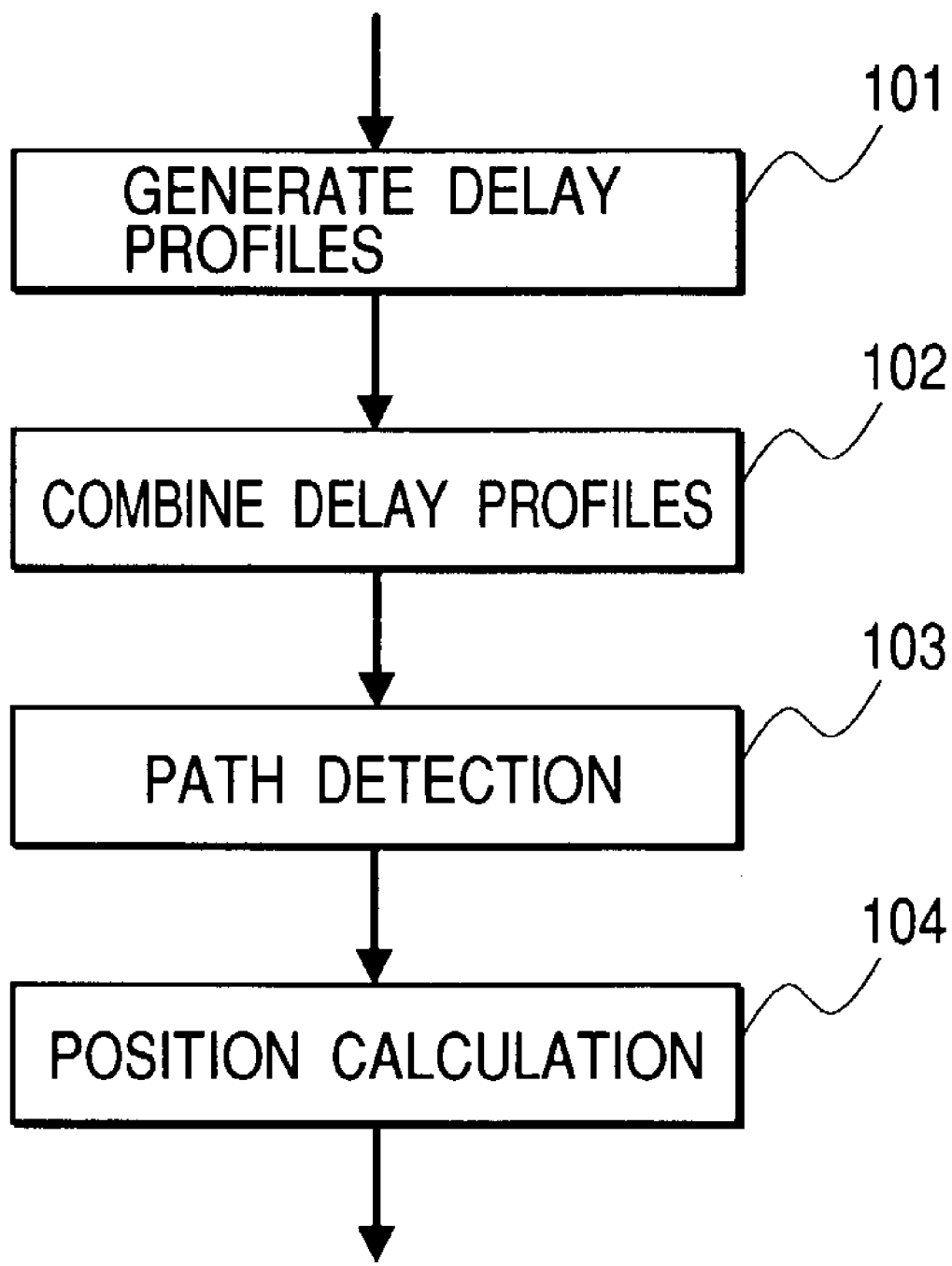
FIG. 1 is a flowchart of the first embodiment of the present invention.

Hereunder, the first preferred embodiment of the present invention will be described with reference to FIG. 1. FIG. 1 shows a flowchart of the first embodiment of the present invention.

The present invention is characterized by the following two methods. One of the methods obtains a plurality of received data (hereunder, to be referred to as snapshots) measured at different times to generate delay profiles corresponding to each of the snapshots. Each of the obtained delay profiles can be described as Pn(T). The "T" denotes a delay time and the "n" denotes an index of a snapshot corresponding to the delay profile.

If a delay profile is received at a subject terminal after the desired signal that has passed a multi-path, the delay profile comes to include the components of the desired signal multi-path and/or the components of interference signals from other base stations. Each of such the components is received through a propagation channel as shown in the equation 8. The propagation path through which each of the components passes is independent of others. On the contrary, the other characteristic method of the present invention is making a weighted combination for highlighting a desired signal component of a specific signal in a delay profile. While this weight used for weighted combination is repre-sented by complex numbers, the combination method could also be represented by the following equation 1.

$$Pc(\tau) = \sum_{n=1}^{N} W_n P_n(\tau) \tag{1}$$

Pc($\tau$): Delay profile after combination
$P_n(\tau)$: Delay profile before combination
$W_n$: Weight for combination A combined delay profile Pc($\tau$) is improved in the signal noise power ratio, since the profile Pc($\tau$) passes a weighted combination process performed with a complex weight that includes a phase rotation part so that coherent summation is done for the desired signal components therein. Consequently, the path detection efficiency in detecting a signal receiving timing is improved. The above description of "the weighted combination for highlighting a desired signal component of a specific signal" can also be represented by the following to make it easier to understand:

The weighted combination means (1) an operation for summing up specific components of each snapshot by compensating them according to the phase difference between them, (2) an operation for estimating a propagation path hn in equation 8 of each of the specific components and summing up those components with a compensation weight, or (3) coherent summation for the specific component. This weighted combination will be described more concretely to make it easier to understand the physical point with reference to FIGS. 13 and 14. In FIG. 13 that shows a conventional technique, signal waves A and B are not taken into consideration to make a weighted combination. The chart in the fourth step, which is an output of incoherent combination, shows an average output of A and B. Because measurement of a distance between a terminal and a base station is an object in this case, the signal wave A is noticed to make coherent summation. In other words, the propagation paths hn of the signal wave A in the received signals observed at the sampling times are compensated respectively and summed up to obtain a combined profile that highlights the signal wave A. According to the present invention, as shown in the fourth step in FIG. 14, it is possible to obtain an output that highlights any of the signal waves A and B to make coherent summation. Consequently, if path detection is done using an output that highlights any of signal waves A and B, signals can be received by avoiding interferences by any multi-path or by any interference wave.

At first, the procedure shown in FIG. 1 will be described. In step 101, a terminal generates delay profiles. How to generate delay profiles is disclosed, for example, in JP-A No. 181242/1995. The correlator shown in FIG. 12 may be used to generate such the delay profiles. Each of the delay profiles generated here is a complex amplitude one that includes I and Q components. In this step 101, a plurality of snapshots are obtained and delay profiles are generated in correspondence with each of the snapshots using such a correlator as the one 6. In step 102, the plurality of delay profiles are combined. The combination is a weighted combination that uses a complex weight as described above. In step 103, path detection is done; the combined delay profiles are then subjected to incoherent combination to obtain power delay profiles and the signal receiving time is decided according to each of the power delay profiles. The combined power delay profile is represented as P=XI*XI+XQ*XQ if the I and Q components are defined as XI and XQ. For this path decision, for example, it is possible to employ a conventional technique that the highest peak is decided as a path receiving timing or a timing having the earliest threshold value or over is decided as a path receiving timing. In the position location in step 104, the position of the terminal is calculated from the positional relationship between the obtained path timing and the position of the transmission source. The conventional technique disclosed, for example, in the patent document 1 can be employed for the detailed terminal position calculation method. This step 104 may not necessarily be performed in the terminal. For example, the position location in step 4 may be done in a position location dedicated server belonging to a wireless network. The present invention can also apply to the terminal position location in such a server.

The method for combining delay profiles in the first embodiment of the present invention will thus be summarized as follows. A plurality of delay profiles are generated with respect to a signal received from a specific base station in which the phase rotates with time. The plurality of generated delay profiles are then combined with a complex amplitude in accordance with the equation 1. Consequently, the signal noise power ratio of each of the combined delay profiles is improved, thereby the sensitivity of the terminal and the path-detection accuracy are improved. Implementation of the method disclosed here to each base station will therefore make it possible to perform coherent summation for respective desired signals from each base station. The result is then subjected to path detection and position location. And, because the signal noise power ratio of each delay profile to be subjected to path detection is improved according to the present invention as described above, the above conventional problems are solved.

Figure 2:
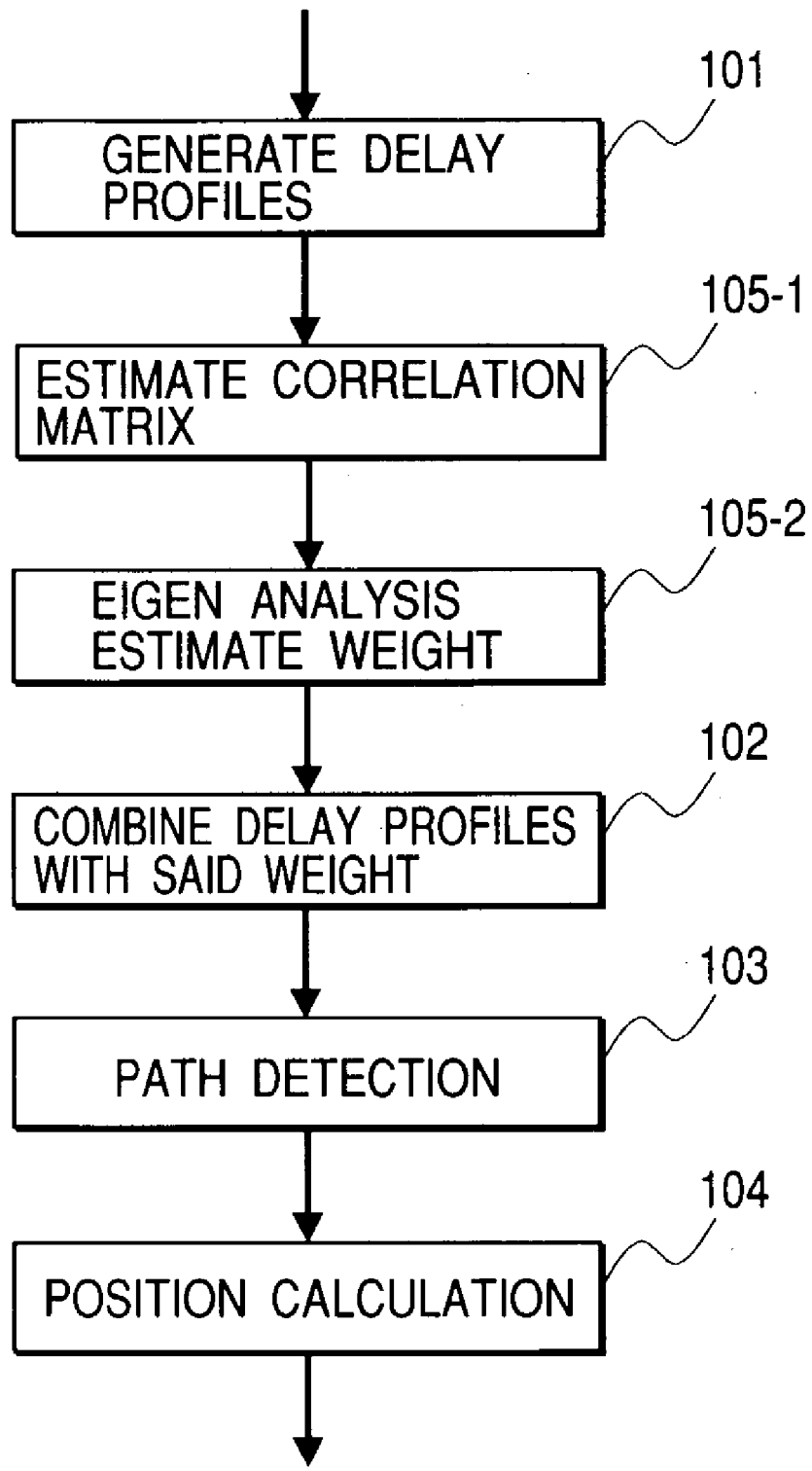
FIG. 2 is a flowchart of the second embodiment of the present invention.

Next, the second embodiment of the present invention will be described with reference to FIG. 2. FIG. 2 shows a flowchart of the second embodiment of the present invention.

The point of this second embodiment is a method for obtaining a weight used for weighted combination. This second embodiment differs from the first embodiment only in the weight calculation method in step 105. Other steps are all identical to those in the first embodiment, so that the description for them will be omitted here. Only the step 105 will thus be described below in detail.

The step 105 is divided into two sub-steps 105-1 and 105-2. Instep 105-1, correlation matrixes R in the equation 2 are calculated from a plurality of obtained delay profiles. And, in step 105-2, eigen analysis is done for each of the obtained correlation matrixes to obtain both eigen value V and eigen vector W. The number of eigen values or eigen vectors obtained above corresponds to the dimension number of each correlation matrix. The obtained eigen vectors are used-to decide a weight used for combination of delay profiles. An eigen vector corresponding to the maximum eigen value is used to select the weight. The weight, as shown in the equation 1, should be a complex conjugate of the obtained eigen vector.

$$R = \begin{bmatrix} r_{11} & \cdots & r_{NI} \\ \vdots & \ddots & \vdots \\ r_{1N} & \cdots & r_{NN} \end{bmatrix} \quad (2)$$

R: Correlation matrix $$r_{11} = \sum_{\tau=1}^{L} P_1^*(\tau)P_1(\tau) \qquad r_{NI} = \sum_{\tau=1}^{L} P_1^*(\tau)P_N(\tau)$$

[W, V]=eig(R)

Here, the "eig(x) denotes an eigen analysis performed for a correlation matrix x.

Each of these eigen values and eigen vectors denotes a signal sub-space represented by an obtained correlation matrix, so the calculation method is generally referred to as a sub-space method. And, a weight decision method that uses those eigen values and vectors is used, for example, to generate an array weight of each array antenna. The present invention employs this method to combine delay profiles using the procedure shown in the equation 2. As a result, the present invention enables a plurality of delay profiles obtained with time to be combined while any of the conventional techniques cannot. This is why the present invention can solve the above conventional problems.

Figure 15:
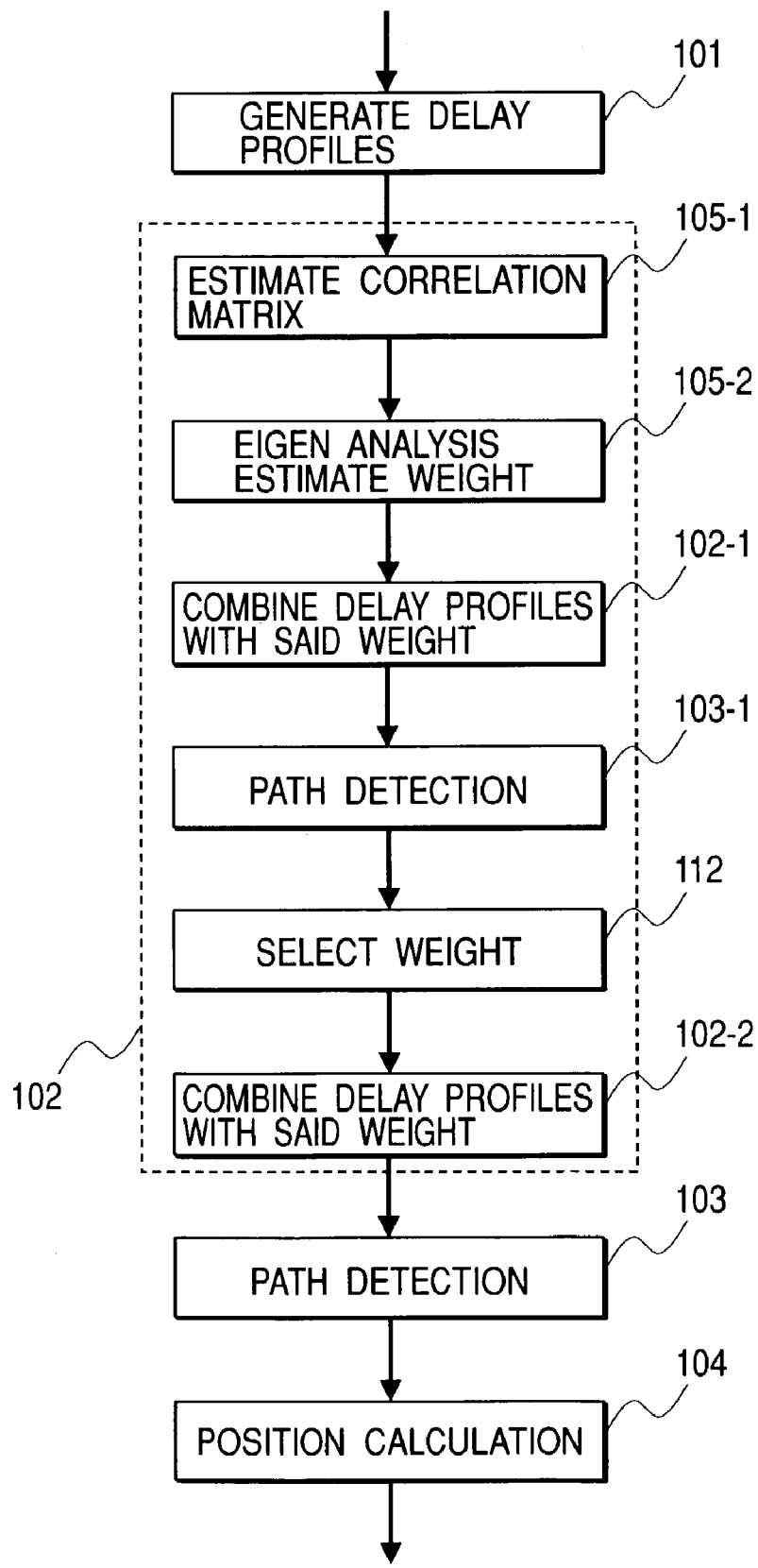
FIG. 15 is a flow chart showing an example of a path timing detection.

While eigen values are developed and an eigen vector corresponding to the maximum eigen value is selected as a weight in the above embodiment, the embodiment may be varied. For example, in another preferable embodiment, eigen values over a certain threshold value are selected and the eigen vectors corresponding to those eigen values are used as weights to generate combined delay profiles corresponding to those eigen vectors in accordance with the equation 1. Then, the plurality of generated and combined delay profiles are subjected to path detection respectively to select a delay profile having the earliest path timing (the shortest delay time) as the final result. Such the method also falls under the category of the present invention. The method disclosed here separates a plurality of paths to reach the terminal as a result of the eigen analysis from each another and selects a path having the shortest (earliest) delay time, that is, a directly arrived wave itself, or a path that might be nearest to the direct wave. FIG. 15 shows a flowchart of such the path detection. For example, if a path having the earliest path timing is to be selected, it is required to combine the delay profiles (step 102-1), each being expected to have a weight obtained from each of all the significant eigen vectors (ex., those corresponding to the components that can obtain an enough receiving power respectively) obtained through eigen analysis. Then, the combined delay profiles are subjected to path detection (step 103-1) respectively, so that a weight is selected according to the result (step 112). The selected weight is then used to combine delay profiles (step 102-2) to obtain a combined delay profile that highlights a path having the earliest path timing. In this connection, it is also possible to replace the step 112 with a new step 103-1 of selecting the optimal one of a plurality of path detection results, since the final combination of delay profiles is already ended in steps 102-1 and 103-1. The steps 102-2 and 103 may be omitted here.

There is a method similar to the above method of the present invention. It is referred to as a MUSIC method. Hereunder, the difference of the method of the present invention from the MUSIC method will be described briefly.

The MUSIC method is characterized as follows; no correlation is taken from between obtained delay profiles, but taken from between delay values set in delay profiles. The analysis method is given in the following equation 3.

$$R = \begin{bmatrix} r_{11} & \cdots & r_{N1} \\ \vdots & \ddots & \vdots \\ r_{1N} & \cdots & r_{NN} \end{bmatrix} \quad (3)$$

R: Correlation matrix $$r_{N1} = \sum_{\tau=1}^{L-N} P_1^*(\tau) P_1(\tau - N) \qquad r_{11} = \sum_{\tau=1}^{L-N} P_1^*(\tau) P_1(\tau)$$

[W, V]=eig(R)

In the equation 3, it will be understood at a view of the elements of each correlation matrix that a correlation is taken from between different delay values in the same profile. Consequently, a signal processing is done to clarify a signal that has the same temporal correlation as that of a signal component. This is the MUSIC method.

On the other hand, the method of the present invention is characterized as follows; a correlation is taken from between different delay profiles and the sub-space method is used to analyze the weight for combining those delay profiles. While the MUSIC method also performs path detection together with the correlation, the method of the present invention does not have such the path detection function; path detection is done in a separately prepared step. And, while the MUSIC method expands each correlation matrix and accordingly comes to have a problem that requires a large throughput. On the contrary, the present invention enables the dimension of each correlation matrix to match with the number of measurements, thereby suppressing the dimension of correlation matrixes. This is another difference from the MUSIC method. Generally, an amount of calculation is proportional to the cube of the correlation matrix dimension, so that the calculation is done many times to analyze a large correlation matrix. The calculation time thus becomes longer.

The patent document 2 also discloses another calculation method similar to that of the present invention. According to the method disclosed in that patent, (1) a plurality of delay profiles separated from each another in the aspect of space or time, (2) the time responses of those delay profiles are developed as eigen values, and (3) the eigen values over a threshold value or the P pieces of the N pieces of eigen values are selected, (4) so that main subspaces matching with the selected eigen values are taken out. According to this method disclosed in the patent document 2, the method for generating correlation matrixes in (2) differs from that of the present invention. In the patent document 2, the eigen analysis is done in accordance with the equation 3 similarly to the MUSIC method to generate correlation matrixes. As a result, delay profiles divided into independent paths are output as eigen vectors. On the other hand, each of the eigen vectors output as a result of the correlation calculation of the present invention becomes a delay profile weight used for weighted combination; it is not a delay profile itself. Consequently, the delay profiles must be combined using such the weight in accordance with the equation 1. However, the dimension of the correlation matrix for eigen value development becomes smaller in the present invention than in the above conventional techniques. In addition, both throughput and time of the whole processing are smaller and shorter in the present invention than in the above conventional techniques. While the method in the patent document 2 locates a position of a terminal using the so-called finger printing method, the finger printing method is the same one as the method of the present invention, which extracts main components of a delay profile without detecting its path and the components are compared with the data of the delay profile obtained beforehand, thereby deciding the point at which the best matching delay profile is obtained as the position of the target terminal. According to the present invention, however, delay profiles are combined using an obtained weight and a path detecting device separately prepared for the combined delay profiles is used to detect the path with the least delay value. The path detection result is then used to detect a position of the target terminal through a trilateration operation. Consequently, concrete calculation and analysis result usage methods differ completely between the conventional method and that of the present invention, although both of the methods use the eigen analysis similarly.

Figure 3:
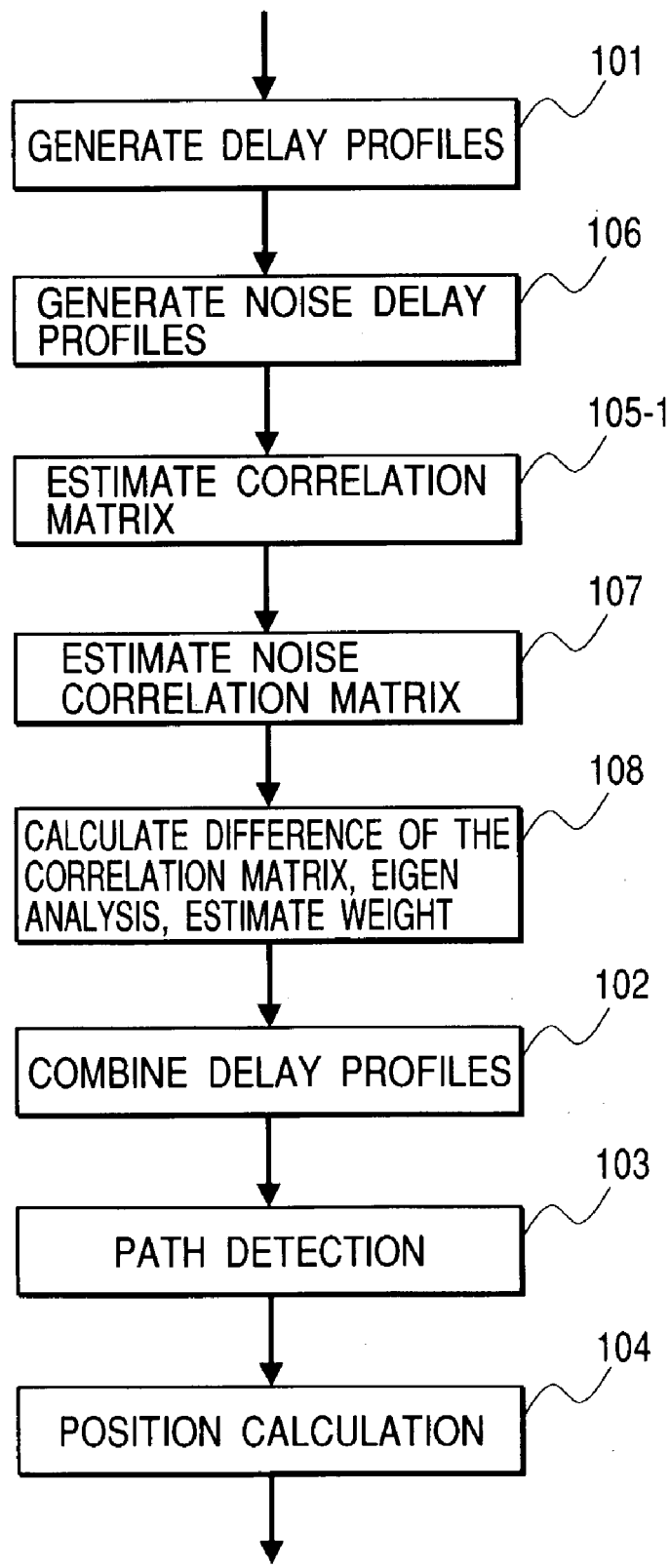
FIG. 3 is a flowchart of the third embodiment of the present invention.

Next, the third embodiment of the present invention will be described with reference to FIG. 3. FIG. 3 shows a flowchart of the third embodiment of the present invention.

The point of the third embodiment is a method for obtaining a weight used for weighted combination. The flowchart shown in FIG. 3 differs from that of the second embodiment only in steps 106 and 107; step 6 generates a noise profile and step 107 obtains a weight. The processings in other steps are identical to those in the second embodiment, so that the description for them will be omitted here. Hereinafter, the processings in steps 106 and 107 will thus be described in detail.

The third embodiment is characterized by a method for generating a noise profile and the utilization of the noise profile. A noise profile means a delay profile that includes a signal or a delay profile that suppresses peak generation by a signal generated intentionally so as not to have the PN phase. It is important here that such a noise profile is generated from the same snapshot as that of the received data used for generating the desired signal delay profile. To generate such a noise profile, one of the following methods is usually employed; (1) the received data snapshot is stored once in a memory, then correlation calculations are done sequentially for the stored snapshot data to generate both delay profile and noise profile and (2) correlators are disposed in parallel and both delay profile and noise profile are generated from the received data simultaneously. And, the effect of the present invention is the same among the above methods.

Hereinafter, the method for generating a noise profile will be described more in detail. At first, a description will be made for a case in which the present invention applies to the IS-95 base structure. In the IS-95, a 32768 long chip PN code is used as a spread code. If the pilot phase of a base station is N and this PN code is used to diffuse signals, the PN code phase is shifted by 64*N chips to diffuse signals and enables its signals to be distinguished from those of other base stations. For example, if the pilot phases of the base stations in the neighborhood are 4, 8, 12, . . . , and 480, then the receiver side reverse-diffusion is adjusted to the transmission pilot phase clearly to generate delay profiles at the base stations having a pilot phase N of around 2 and 6. Consequently, it is possible to generate a noise profile that generates no peak. Of course, such a noise profile can also be generated by reverse-diffusion by different PN sequences in a generation polynomial.

The object of this noise profile is to calculate a noise subspace to reduce the interference by noise, then subtract the noise subspace from a signal subspace in which signal correlation matrixes are already calculated. The following equation 4 shows how to calculate a weight in this third embodiment.

$$R_{ss} = R - R_{nn} \quad (4)$$

R: Correlation matrix $$R_{nn} = \begin{bmatrix} r_{11}^{nn} & \cdots & r_{N1}^{nn} \\ \vdots & \ddots & \vdots \\ r_{1N}^{nn} & \cdots & r_{NN}^{nn} \end{bmatrix} \quad r_{NI}^{nn} = \sum_{\tau=1}^{L} N_1^*(\tau) N_N(\tau)$$

$[W, V] = \text{eig}(R_{ss})$

Here, the "R" denotes a correlation matrix of a delay profile obtained in the second embodiment. The "N1(r) denotes the above-described noise profile. The noise profile and the above-described delay profile are generated for the same snapshot. For example, when N snapshots are measured, both signal profiles and noise profiles corresponding to a specific PN sequence are generated by N pieces respectively. Consequently, the dimension numbers of the Rn and the R become the same. And, because the correlation matrix R is a total of signal subspace+noise subspace, the noise subspace Rnn is subtracted from the correlation matrix R to enable the accurate estimation of the target weight so as to highlight the signal subspace more. Then, the signal subspace Rss, which is a result of this calculation, is subjected to an eigen analysis to enable weighted combination of delay profiles with use of the eigen vector having the maximum eigen value, thereby the delay profiles are combined so as not to be affected by interference so much. The present invention can thus solve the above conventional problems.

Next, a description will be made for a variation of this third embodiment, that is, a method for obtaining a noise profile more accurately. A noise profile has characteristics that it comes to have more accurate statistical information as the number of sample points increases in the subject profile. However, because the number of sample points in a delay profile to be observed is decided by a parameter of the correlator, the number of sample points comes to be related to the delay value of the delay profile. For example, for a 1 MHz band chip rate signal, if a delay profile is generated at ½ chip sampling intervals with respect to about 128 sample windows, a propagation delay can be measured within a range of about 16 km. The number of such sample points in this propagation delay measurement is enough to detect the position of a target terminal in the cellular communication to be performed among base stations disposed at 2 to 5 km intervals. To obtain the statistical stability of the above noise subspace, about 400 sample points are required. Consequently, M delay profiles (ex., 128 samples) are generated from the same snapshot. In this connection, those delay profiles use different PN sequences and come to have a plurality of different fixed lengths. And, as shown in the equation 5, the delay profiles are summed up and averaged in correlation matrixes to find noise correlation matrixes to assure the statistical stability of the noise subspace, thereby solving the above conventional problems.

$$W' = \frac{W}{R_{nn} + \sigma I} \quad (5)$$

Figure 4:
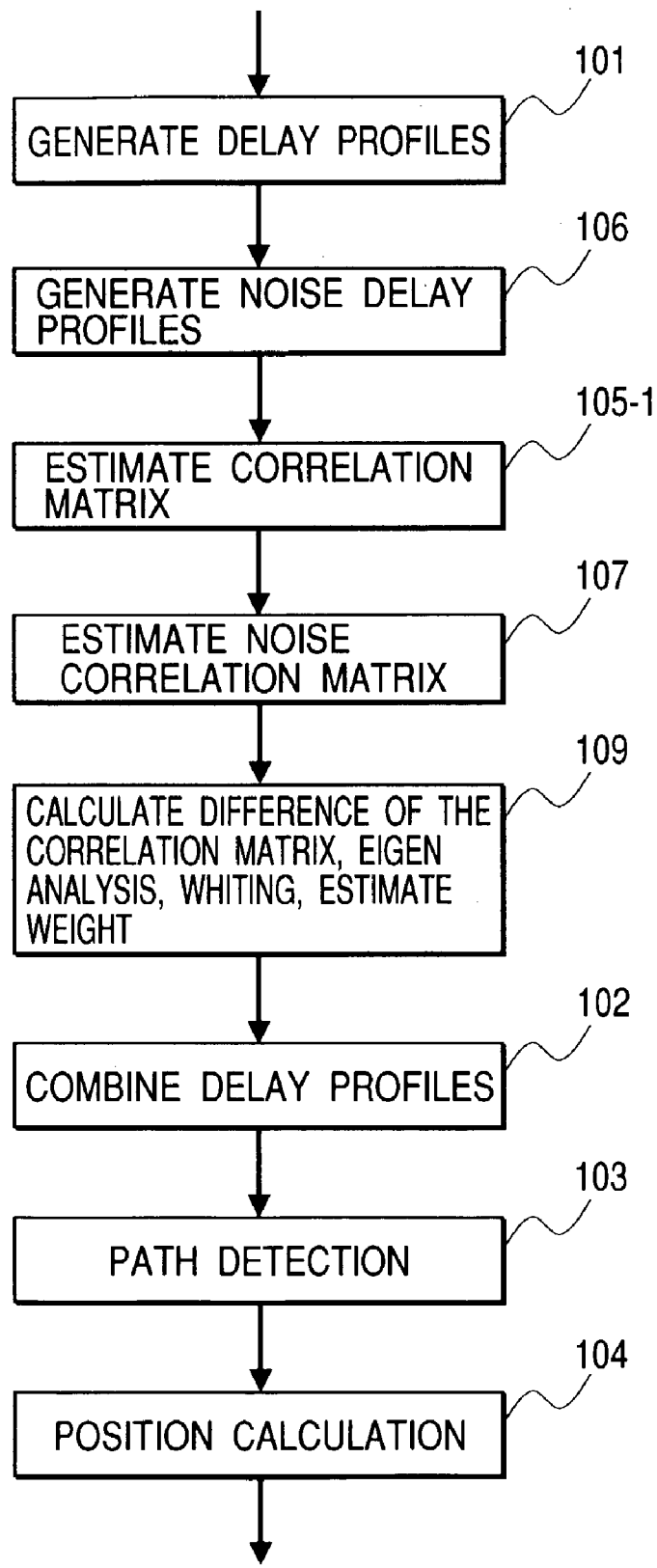
FIG. 4 is a flowchart of the fourth embodiment of the present invention.

Next, the fourth embodiment of the present invention will be described with reference to FIG. 4. FIG. 4 is a flowchart of the fourth embodiment of the present invention.

The point of the fourth embodiment is a method for obtaining a weight used for weighted combination. The flowchart of the fourth embodiment shown in FIG. 4 is identical to that of the third embodiment except for step 109 in which a weight is calculated. Hereunder, therefore, the processing in step 109 will be described in detail while the description for other steps will be omitted here.

The fourth embodiment is characterized by a method for generating noise profiles and using them. In the third embodiment, a noise subspace is calculated to reduce the interference by noise and the noise subspace is subtracted from the signal subspace for which the signal correlation matrix is already calculated. The object of this calculation is to clarify only the signal subspace to obtain the target weight more accurately. However, the method disclosed in this fourth embodiment eliminates interference signals to reduce the power almost to zero by combining interference signals on the supposition that the interference is stronger. The interference elimination mechanism is as follows. In the present invention, while delay profiles are generated in a plurality of stages, both target and interference wave signals rotate their phases independently of each another due to the fading and/or frequency shift to occur between oscillators of base stations. In the above third embodiment, only the desired signal is watched to generate a weight at which the power takes the maximum value. Noise is usually white and if a plurality of delay profiles are combined, the noise power is reduced to zero step by step regardless of the weight. On the contrary, each interference wave is colored, since a specific interference pattern is given to its delay profile. When those delay profiles are summed up with a specific weight, interference patterns are subjected to coherent summation, thereby the noise power is not reduced to zero sometimes. This fourth embodiment thus whites the noise. Concretely, the method of the present invention adjusts the weight so as to reduce the main interference power to zero even at the slight sacrifice of the signal power, thereby obtaining a weight at which the signal level becomes the maximum under the constraint condition. This method can be realized by the implementation of the following equation 6.

$$\max_{W} \left\{ \frac{\max_{\tau} \left\{ \left| \sum_{n=1}^{N} W_n P_n(\tau) \right|^2 \right\}}{\text{Noise}} \right\} \quad (6)$$

Here, the "Rnn" denotes a correlation matrix generated from a noise profile. This correlation, as described in the above embodiment, may be generated with use of a plurality of PN sequences or from a single PN sequence. Generally, a correlation matrix generated from a plurality of PN sequences can obtain higher statistical stability and it is more effective. The "W" denotes a weight obtained by the equation 4. The "W'" denotes a target weight used for eliminating interference signals. The "I" denotes a unit matrix and the "σ" denotes a parameter used to decide a degree to eliminate interference signals from the subject electric power. The weight obtained by this calculation is restrained so that interference signals are not summed up in phase. This embodiment can thus obtain a weight that is not affected by interference signals so much, thereby it can solve the above conventional problems.

Figure 5:
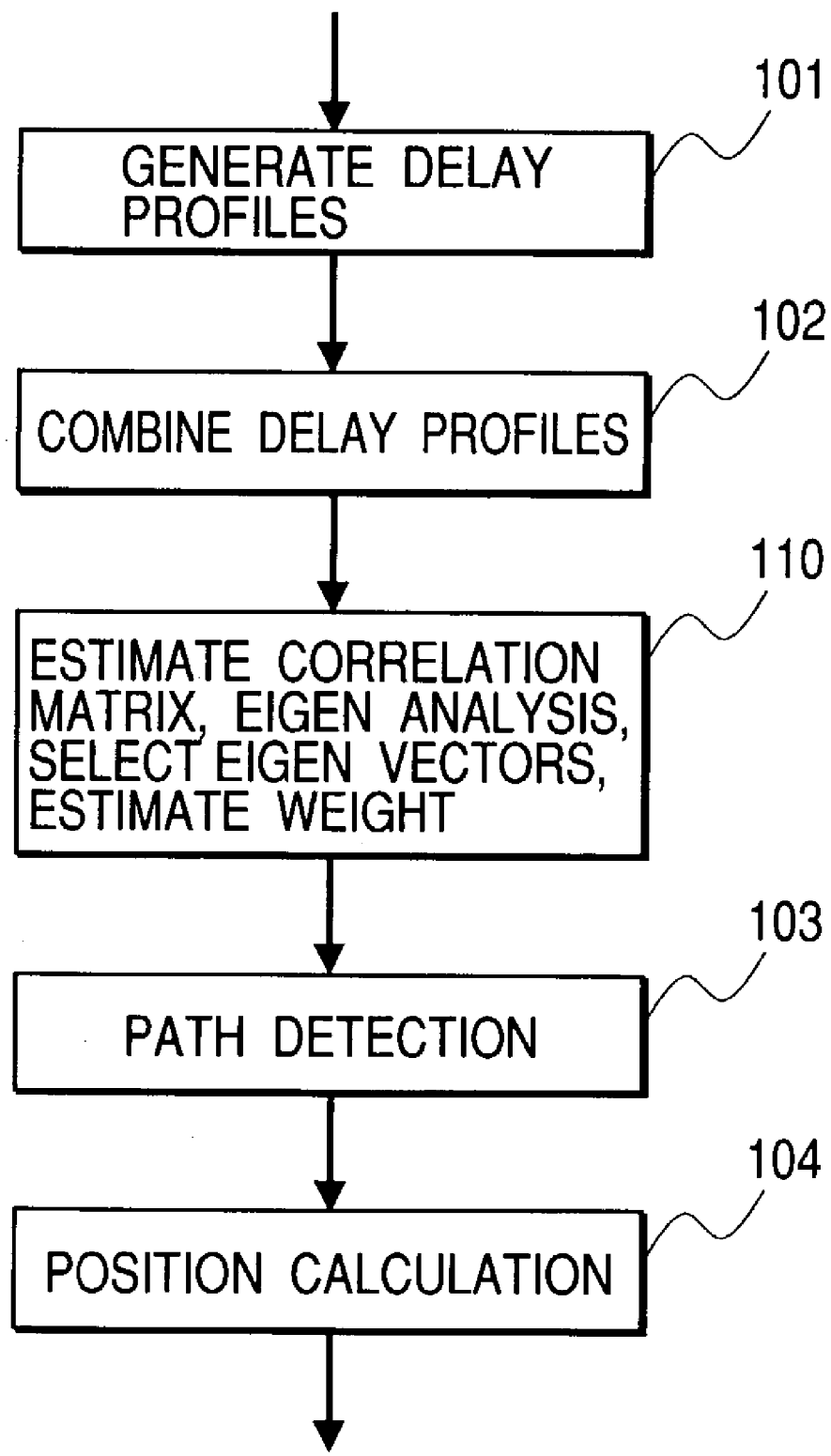
FIG. 5 is a flowchart of the fifth embodiment of the present invention.

Next, the fifth embodiment of the present invention will be described with reference to FIG. 5. FIG. 5 shows a flowchart of the fifth embodiment of the present invention. The point of this fifth embodiment is a method for selecting a weight used for weighted combination. The flowchart shown in FIG. 5 is identical to that of the second embodiment except for step 110 in witch a weight is selected; the processings in other steps are the same as those in the second embodiment, so that the description for them will be omitted here and hereinafter only the processing in step 110 will be described in detail.

In the above embodiment, one of a plurality of eigen vectors obtained as a result of eigen analysis, which corresponds to the maximum eigen value, is selected. This selection, however, come to arise the following problem. When the power of an interference signal is larger than that of a desired signal, the maximum eigen value becomes a weight with which the maximum eigen value takes the maximum interference signal power. Thus, the weight cannot be used for coherent summation of the desired signals.

In order to solve this problem, this fifth embodiment targets combined delay profiles. As described above, a delay profile is a result of correlation calculation for a transmitted signal, so the correlation between desired signals becomes high, thereby a peak occurs in the delay profile of each desired signal. While such a peak also occurs suddenly due to an interference signal and/or noise, the power does not exceed the noise level. Consequently, for example, when there are 32 eigen values, 32 combined delay profiles are generated with 32 types of weights. After this, a delay profile having the maximum ratio of the maximum value of the combined delay profiles to the noise level is selected to select a weight that has caught the desired signal. The following equation 7 is usable for this calculation.

$$\max_W \left\{ \frac{\max_\tau \left\{ \left| \sum_{n=1}^{N} W_n P_n(\tau) \right|^2 \right\}}{W^H R_{nn} W} \right\} \tag{7}$$

$W=[W_1, W_2, \ldots, W_n]^T$ H: operator of transpose conjugate
Here, the "Noise" denotes a noise power.

Consequently, a weight used to generate a delay profile having a peak is selected, thereby a weight for enabling specific signals to be summed up in phase even in an environment dominated by interference signals. This is why this fifth embodiment can solve the above conventional problems. A noise power, as shown in the equation 7, is found by finding the power at each sample point in each combined noise profile and averaging the obtained power values.

Figure 6:
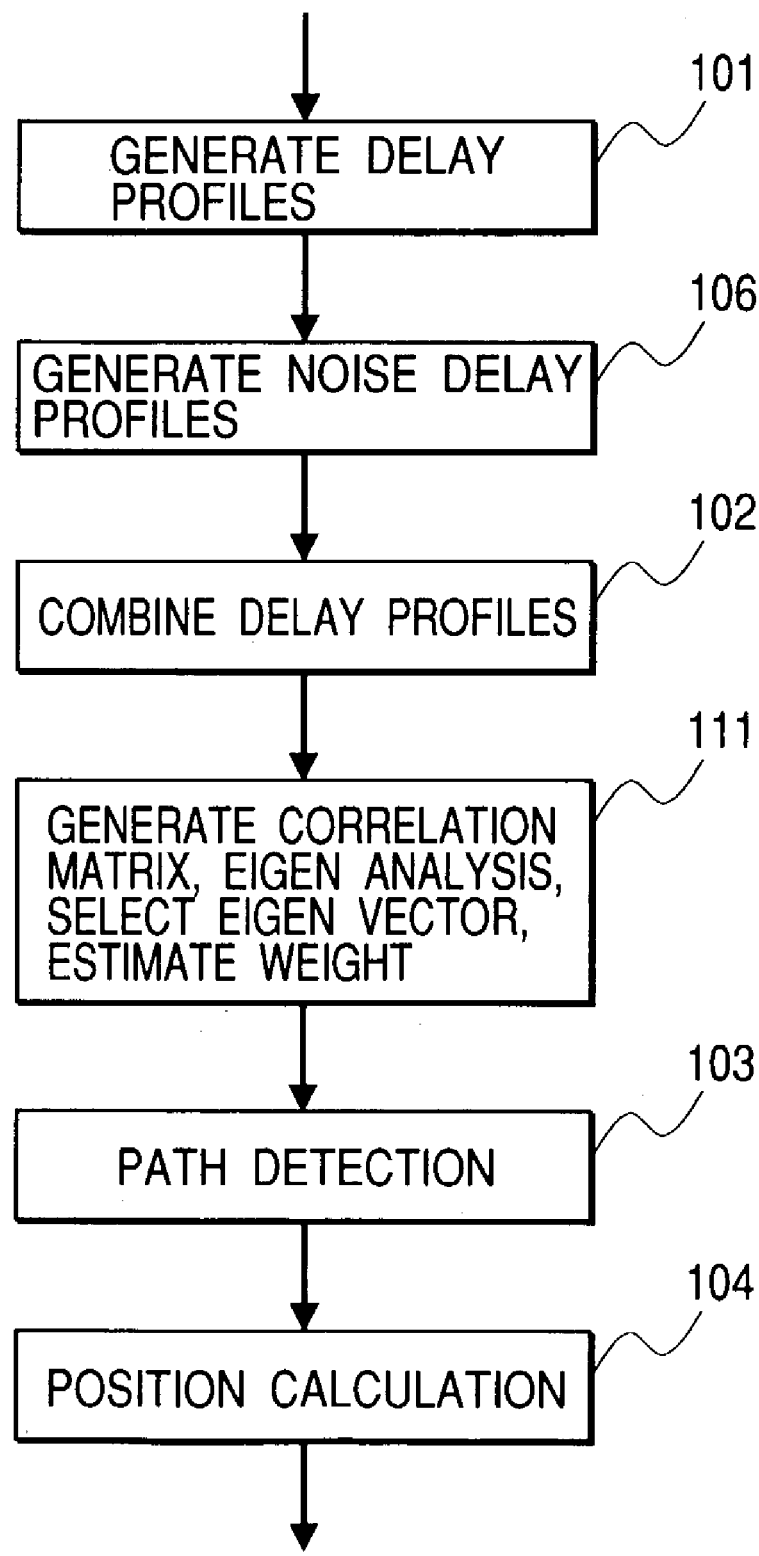
FIG. 6 is a flowchart of the sixth embodiment of the present invention.

Next, the sixth embodiment of the present invention will be described with reference to FIG. 6. FIG. 6 shows a flowchart of this sixth embodiment of the present invention. The point of this sixth embodiment is a method for calculating the noise power at the dominator in the equation 6 for selecting a weight used for weighted combination. When an interference signal is large, a correlation occurs between noise profiles due to the interference signal as described above. The correlation matrix is thus colored (or correlated). Consequently, the average noise power value changes in each of the combined noise profiles due to how a weight is selected. Similarly, this also occurs in the portion of each delay profile, in which no correlation peak occurs due to a signal therein. If a weight that highlights a specific interference component is selected, the signal noise ratio falls relatively due to the highlighted interference component. In the flowchart shown in FIG. 6, only the steps 110-2 and 106 differ from those in the fifth embodiment. The step 110-2 is for weight selection/calculation and the step 106 is for generating a noise profile. However, because the step 106 is similar to those in the third and fourth embodiments, the description for the step will be omitted here. Only the step 110-2 will thus be described in detail here.

In the above embodiment, the noise power is calculated by the following equation 8. This calculation result becomes equal to a value obtained by averaging the respective sample power values of the above combined noise profiles. The calculation amount of the equation 8 can be reduced more significantly than the noise power calculation method used in the equation 7 if the correlation matrix Rnn is calculated beforehand. The noise power can thus be calculated by less number of calculations.

$$P_n(\tau) = h_n P_{Tx}(\tau) \tag{8}$$

$P_{Tx}(\tau)$ A original wave
$P_n(\tau)$ Received wave component with propagation channel effect
$h_n$ Propagation channel Here, the "Rnn" denotes a noise profile correlation matrix obtained by the equation 4 and the "W" denotes a weight generated from an eigen vector corresponding to an eigen value. (The weight is obtained with an eigen vector conjugate as described above.)

Figure 7:
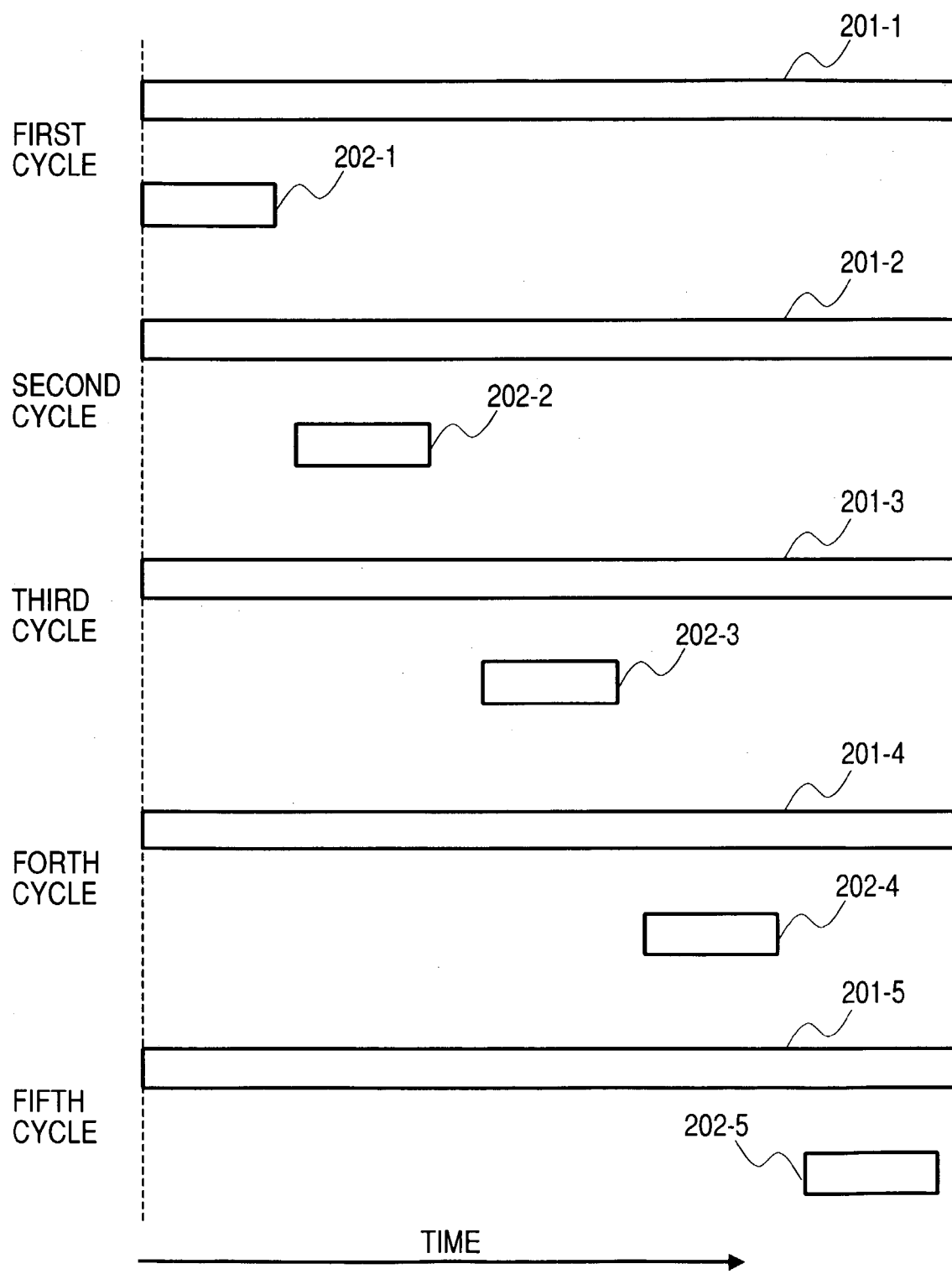
FIG. 7 is a diagram showing the seventh embodiment of the present invention.
Figure 8:
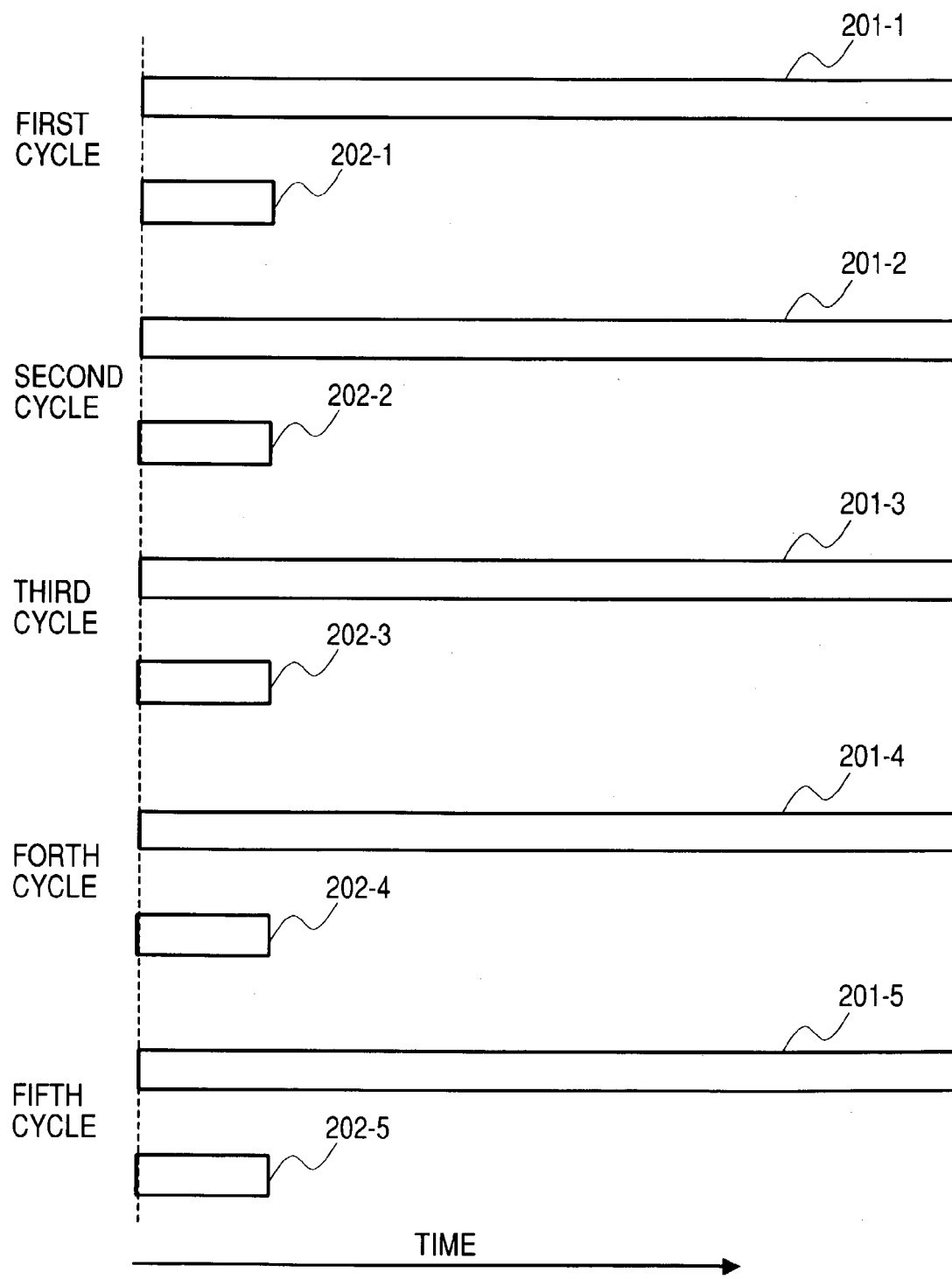
FIG. 8 is a diagram to explain a method for obtaining general snapshots.

Next, the seventh embodiment of the present invention will be described with reference to FIG. 7. Tn the above sixth embodiment, a description has been made for a technique for obtaining a plurality of snapshots and combining delay profiles calculated from those snapshots. The object of this embodiment, however, is a method for obtaining snapshots if information transmitted from a base station is cyclical one. At first, a general method for obtaining snapshots will be described with reference to FIG. 8. In FIG. 8, the horizontal axis denotes a time flow. Transmitted information is a cycle function and the first cycle and the second cycle are represented as 201-1 and 201-2. The first cycle (201-1) begins at the left side and goes to the right with time. When the right end is reached, the first cycle moves to the left of the second cycle (201-2). Here, 202-1 to 202-5 denote time bands in which snapshots are obtained. As shown clearly in FIG. 8, a snapshot is always obtained synchronously with the information cycle in this example. In a system in which both terminal and base station are synchronized with each other, such the controlling method (snapshots are obtained synchronously with information cycles) shown in FIG. 8 will become more easy and advantageous. If interference signals are taken into consideration, however, such the method for obtaining snapshots is not so good. Because, signals received from other base stations might also be the same cycle signals and interference signals and snapshots might be obtained in the same time band. Consequently, interference patterns of the interference signals from other base stations to be affected on delay profiles always become the same. And, when those delay profiles are combined, such interference signals are summed up in phase to the combined delay profiles, thereby the delay profiles come to be affected by the interference signals significantly. In order to avoid such the problem, this embodiment enables snapshots to be obtained in different time bands as shown in FIG. 7. Consequently, interference patterns of the interference signals from other base stations to affect delay profiles come to differ from snapshots in obtaining timing, so that the interference patterns come to differ between delay profiles, thereby delay profiles are not affected so much by interference signals. The above conventional problems can thus be solved. On the other hand, if a cycle signal having a cycle T is received and the number of snapshots to be received at a time is defined as D (D<T in this case), then the receiving timings L of the snapshots can be diffused so that the (L mod T) does not take a specific value. As a result, this embodiment becomes effective. If there are to many snapshots and the receiving timings of the snapshots come to overlap unavoidably, the less the snapshots overlap, the more the effect of this embodiment will increase, of course.

Figure 9:
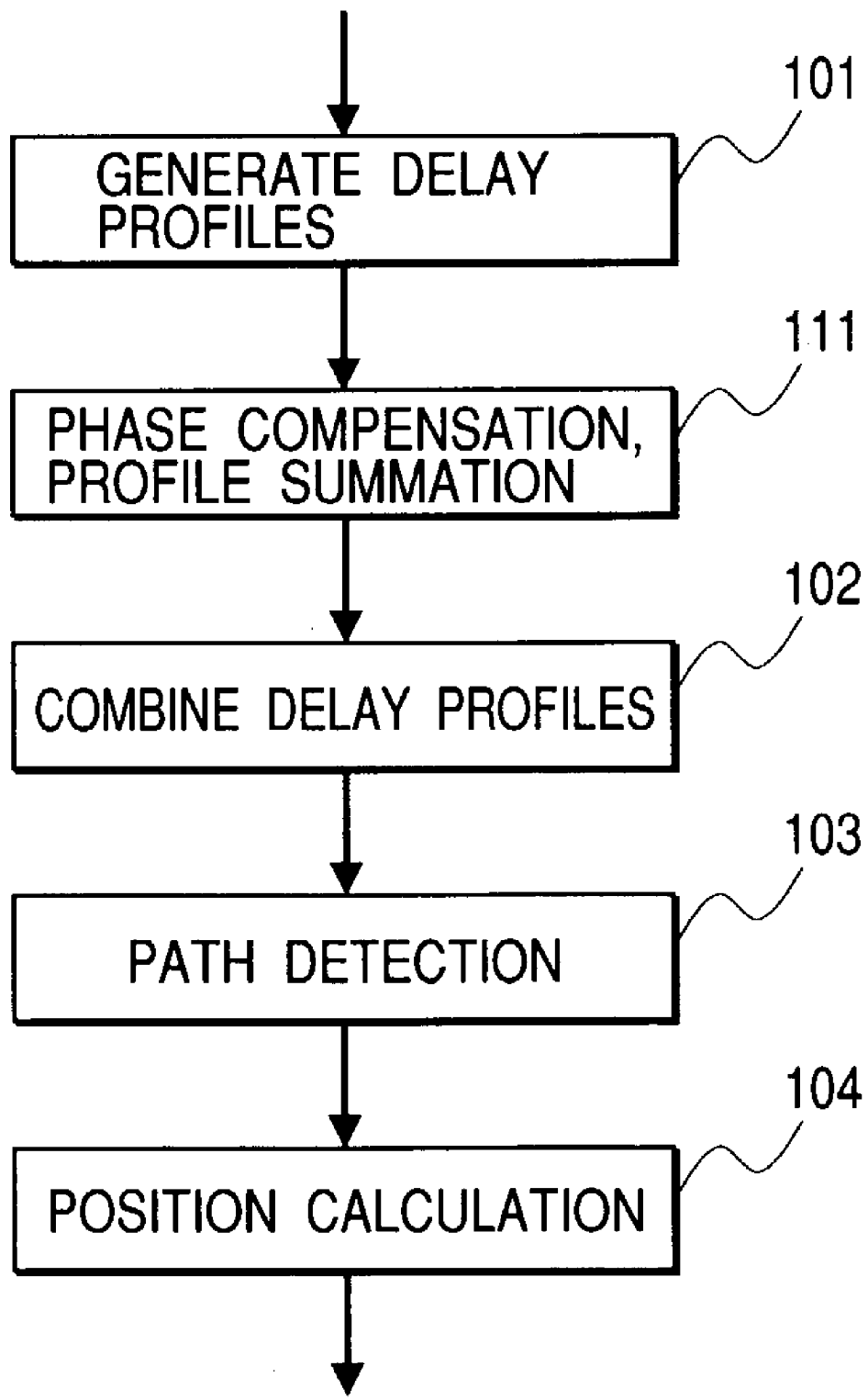
FIG. 9 is a flowchart of the eighth embodiment of the present invention.

Next, the eighth embodiment of the present invention will be described with reference to FIG. 9, which is a flowchart of the eighth embodiment of the present invention. The point of this eighth embodiment is step 111 for calculating a weight. Other steps in this eighth embodiment are the same as those in other embodiments described above, so that the description for them will be omitted here; only the step 111 will thus be described in detail.

In other embodiments described above, a weight is calculated through an eigen analysis of a correlation matrix obtained from between delay profiles. On the other hand, the method for calculating a weight in this embodiment is effective when the time interval between snapshots is short and a frequency shift occurs between a terminal oscillator and a base station oscillator, although the weight is not affected so much by the frequency shift to occur between base station oscillators and the fading. In this connection, the phases of the signal components of the generated delay profiles rotate due to the frequency shift to occur between a base station oscillator and a terminal oscillator as described above. This phase rotation, however, is common to all the base stations. If how much the phase of a specific base station rotates is estimated, therefore, the phase rotations of other base stations are compensated. This point should be noticed. In addition, while signals received from a base station are calculated independently from those of other base stations in the above embodiments, the phase rotations of all the base stations are compensated commonly in this embodiment. This point differs from other embodiments described above.

In this embodiment, signals from a specific base station are noticed. Preferably, the specific base station should have a stronger signal power. Delay profiles are generated for the signals from this base station and power delay profiles are calculated to detect the maximum value. Control then goes back the original complex amplitude delay profile to detect a timing at which the detected delay profile takes the maximum value. This conjugate is defined as a weight of the delay profile. Then, the same weight is also used for delay profiles of other base stations, generated from the same snapshot. What should be noticed carefully here is an amplitude of a weight. Preferably, the amplitude should be standardized so that the size (norm) becomes 1. This is to avoid that a signal strength of a specific base station applies to each base station as a weight.

The above processings can thus compensate the phase rotation of each delay profile. Consequently, the signal noise power ratio of each combined delay profile is improved through the summation operation shown in the equation 1, thereby the above conventional problems can be solved.

This embodiment has a variation, which is a hybrid one with other embodiments. For example, it is a case in which four delay profiles corresponding to four snapshots are combined. The method of this eighth embodiment can apply to two delay profiles corresponding to the nearest two snapshots while the time interval between snapshots is short. However, this eighth embodiment cannot apply to, for example, the first and fourth delay profiles with a little longer time interval therebetween, since each base station phase rotates independently. Hereinafter, such a case in which this eighth embodiment cannot apply will be described. At first, a description will be made for a case in which this eighth embodiment applies to the first and second, as well as the third and fourth delay profiles. Each pair of them is combined to obtain two combined delay profiles. On the other hand, the two combined delay profiles are subjected to a method for developing eigen values as described in the above embodiments to obtain one delay file in the final stage. The advantage of this hybrid method is reduction of the processing time and reduction of the required memory capacity.

If a terminal is provided with an AFC (Auto Frequency Controller) used to synchronize itself with signals of each base station, the phase compensation between the terminal and each base station can be omitted. A method for combining delay profiles by analyzing the eigen value according to such a calculation result also falls under the category of the present invention.

While the CPU 8 performs processings to calculate, rotate, and sums up phases, a dedicated circuit, for example, a gate array may also be used to perform such the processings for the output of the pilot channel correlator 6. And, such the method also falls under the category of the present invention.

Figure 10:
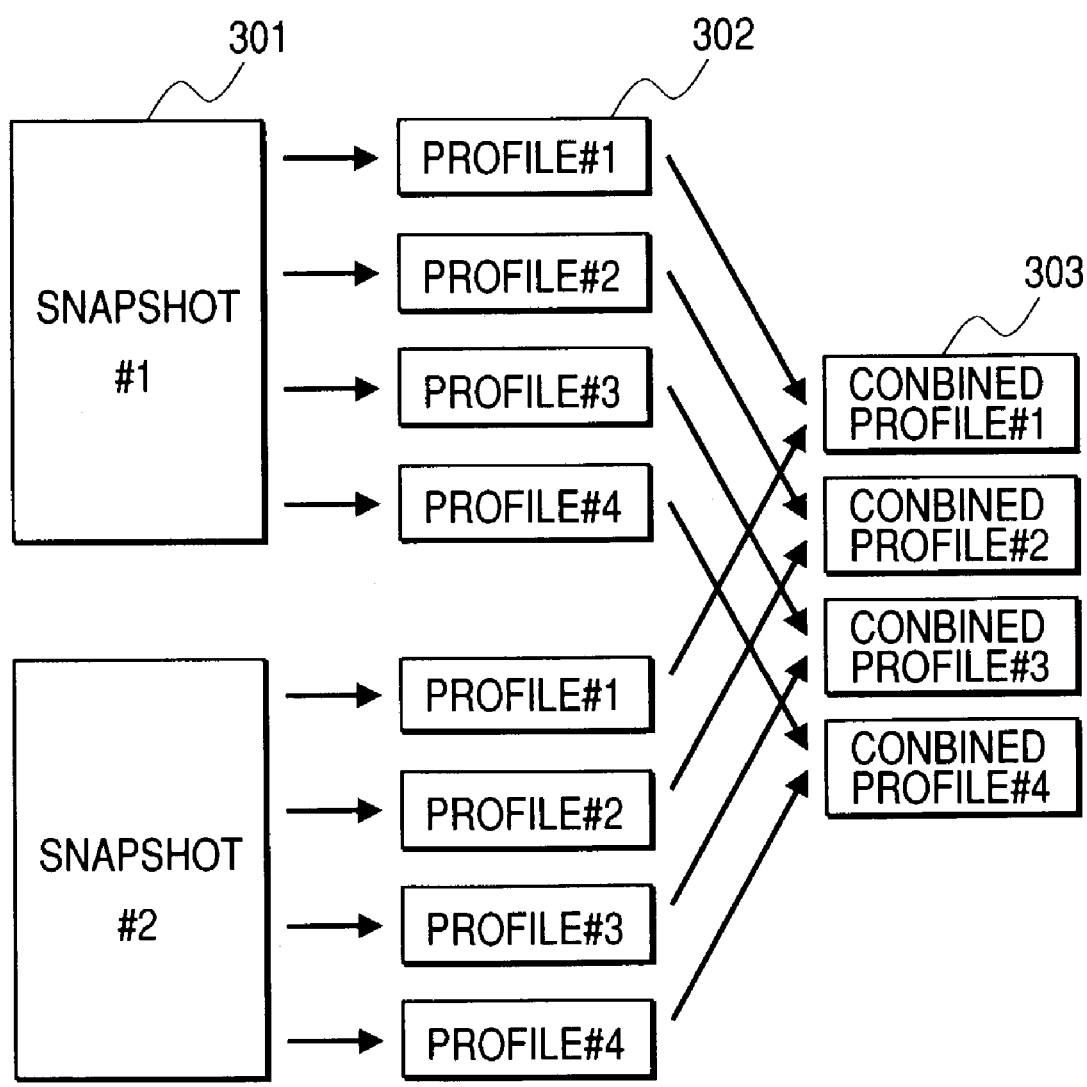
FIG. 10 is a diagram to explain a method for obtaining snapshots and combining delay profiles according to the present invention.
Figure 11:
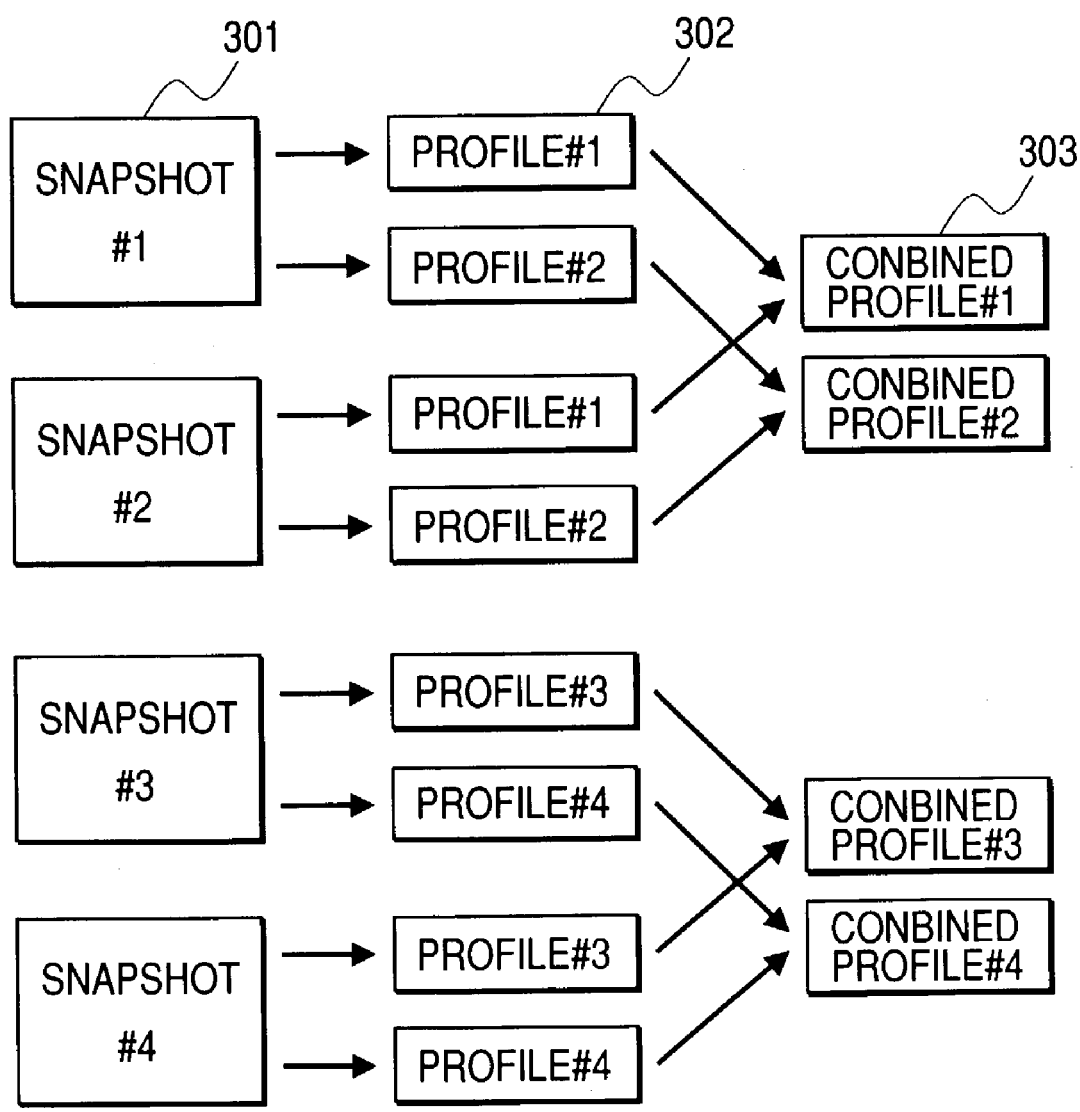
FIG. 11 is a diagram to explain a method for obtaining snapshots and combining delay profiles in the ninth embodiment of the present invention.

Next, the ninth embodiment of the present invention will be described with reference to FIGS. 10 and 11. FIG. 10 shows a procedure for generating delay profiles according to the present invention as described above and FIG. 11 shows a procedure for generating delay profiles in this ninth embodiment. The object of this ninth embodiment is to reduce the capacity of the memory for storing delay profiles.

FIG. 10 shows a procedure for obtaining delay profiles in the embodiments of the present invention described above. At first, a terminal obtains a snapshot #1 (301). Then, for example, the terminal generates delay profiles (302) #1 to #4 corresponding to four base stations from this snapshot. After this, the terminal obtains a new snapshot #2. The terminal then generates delay profiles corresponding to the four base stations from this snapshot. Those delay profiles of those two snapshots 301 and 302 are then combined to obtain combined delay profiles (303). And, to perform those processings, delay profiles corresponding to each snapshot are stored beforehand in a memory in an intermediate step. For example, when signals received from 20 base stations are to be analyzed, delay profiles of 16 snapshots are combined and the number of sample points of one profile is 128, the memory is required to store IQ delay profiles of (20×16×128 samples). This embodiment discloses a method for dividing and processing those IQ delay profiles to reduce the number of samples to be stored.

Next, the procedure of this embodiment will be described with reference to FIG. 11. At first, a terminal obtains a snapshot #1 (301) similarly to the above example. Then, the terminal generates delay profiles (302) from this snapshot #1 (301); the terminal is not required to generate delay profiles for all the necessary base stations (N stations) at this time, but divides the base stations into some groups and generates the profiles #1 and #2 of only the groups, that is, the base stations #1 and #2. Next, the terminal obtains another snapshot #2 and generates only two delay profiles #1 and #2 from the snapshot #2 similarly. Then, each pair of the profiles #1 and #2 are combined to obtain combined delay profiles (303) #1 and #2. After this, the terminal obtains still another snapshot #3 and generates delay profiles #3 and #4 of another group, that is, from the snapshot #3. Then, the terminal obtains still another snapshot #4 and generates delay profiles of the base stations #3 and #4, then combines those profiles to obtain combined profiles. Such way, the terminal, when obtaining delay profiles related to a plurality of base stations, divides the base stations into some groups and combines delay profiles of each of those groups before processing the next group. If base stations are divided into some groups such way, the number of profiles to be stored at a time can be reduced. For example, when 20 base stations are divided into two groups, the memory capacity required for analyzing one group becomes 10×16×128 samples. While the time for obtaining snapshots is doubled, the memory capacity is reduced to a half. Consequently, the present invention can apply to any memory provided with a small capacity memory. The above conventional problems can thus be solved.

Next, a configuration of the terminal of the present invention will be described with reference to FIG. 12.

Figure 12:
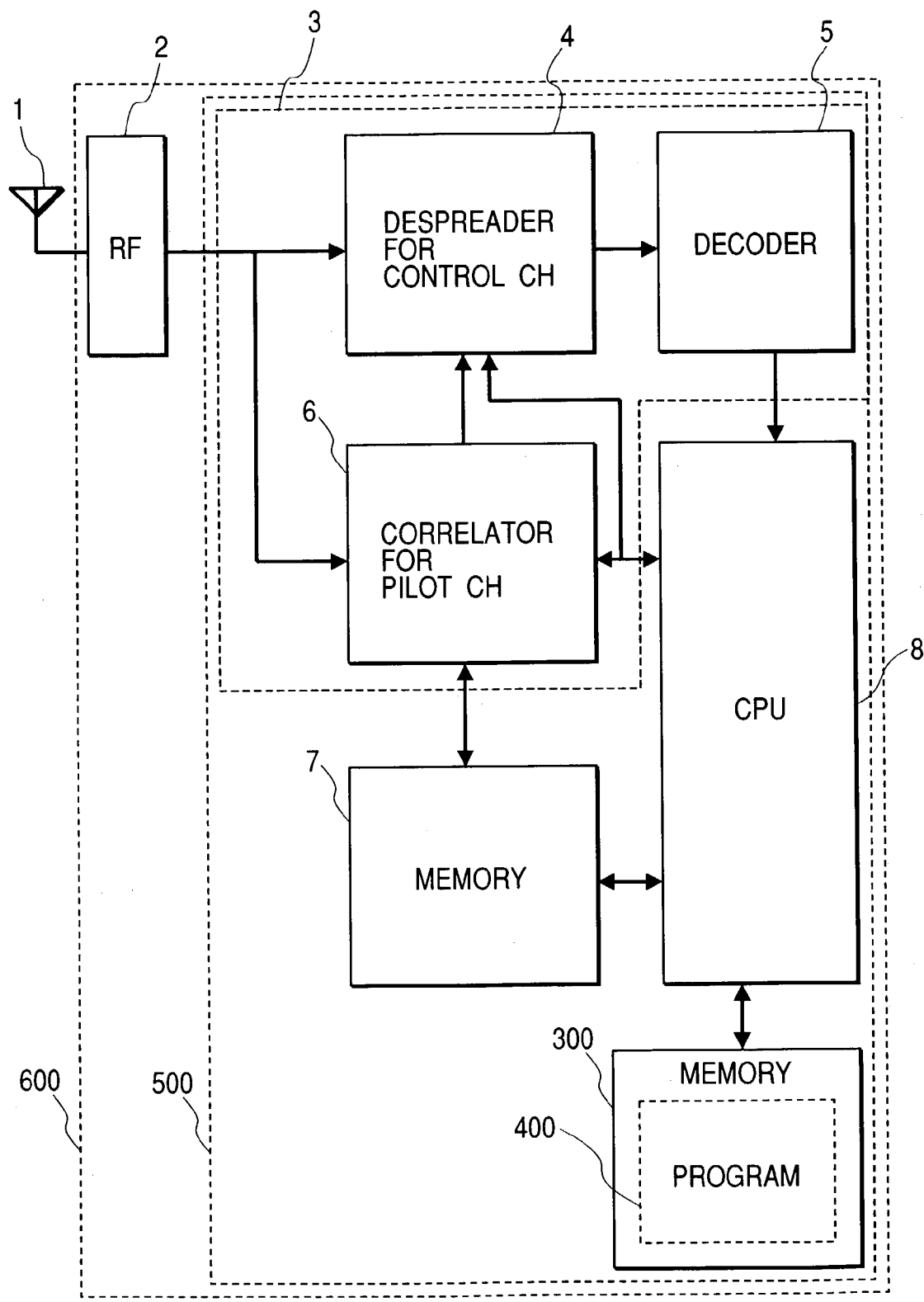
FIG. 12 is a block diagram of a terminal.

In FIG. 12, signals received by an antenna 1 are converted to base band signals in an RF unit 2. A correlator 6 then generates delay profiles for each of the signals. The generated delay profiles are stored in a memory 7. A CPU 8 then processes the signals with respect to the delay profiles stored in the memory 7 and combines those delay profiles. The CPU 8 also makes path detection. This CPU 8 may locate the position of each terminal or send a path detection result to a server disposed on a wireless line (not shown here) so that the server locates the position of the terminal. Because the point of the present invention is a method for combining delay profiles, the present invention includes any of the above cases if the above method is used to combine delay profiles. A program 400 that describes the procedure and the equations, which are the points of the present invention, is stored in a memory 300. As described above, the embodiment of the present invention is varied widely. For example, not only a case in which a device shown in FIG. 12 is configured by discrete parts, but also a case in which a terminal provided with the memory 300 for storing the program 400 are considered as variations of the embodiment of the present invention. In addition, the memory 300 itself is an embodiment of the present invention. And, for example, a device provided with an integrated circuit that includes such blocks as denoted by the dotted lines 500 and 600 in FIG. 12, as well as the integrated circuit itself are taken as embodiments of the present invention.

The present invention also includes a method for storing snapshots once, although it is not shown in FIG. 12. A device provided with a memory for storing the base band signals converted in the RF unit 2 once, as well as an integrated circuit fall under the category of the present invention.

According to the present invention, the subject terminal is provided with means for subjecting signals to coherent summation, thereby enabling the terminal position to be located with use of weak signals even in an environment in which only such the weak signals are received.

What is claimed is:

1. A method for wireless position location of a mobile station with use of signals transmitted between said mobile station and a plurality of base stations, comprising:

step 1 of observing said transmitted signals to take out periodically at a plurality of time points as snapshots and calculating a correlation between a signal transmitted between said mobile station and each of a plurality of specific base stations included in said plurality of base stations and each of said transmitted signals with respect to each of said plurality of snapshots, thereby generating a delay profile corresponding to each of said plurality of snapshots for each of said plurality of base stations;

step 2 of combining said plurality of delay profiles with a respective weight to generate a combined delay profile for each of said plurality of specific base stations;

step 3 of detecting a path timing corresponding to each of said plurality of specific base stations according to said combined delay profile; and step 4 of locating said position of said mobile station according to said path timing detected with respect to each of said plurality of specific base stations.

2. The method for wireless position location according to claim 1;

wherein a correlation matrix for said plurality of delay profiles is obtained and a plurality of weights used for said weighted combination are selected according to a plurality of eigen vectors obtained through eigen analysis of said correlation matrix to generate a plurality of combined delay profiles in said step 2 for calculating said weight;

wherein a plurality of path timings are detected according to said plurality of combined delay profiles in said step 3; and wherein one path timing selected from said plurality of path timings according to the timing is used in said step 4.

3. The method for wireless position location according to claim 1; wherein said step 2 includes step 5 of obtaining a correlation matrix for said plurality of delay profiles and selecting a weight used for said weighted combination from a plurality of eigen vectors obtained through eigen analysis of said correlation matrix.

4. The method for wireless position location according to claim 2;

wherein said step 1 includes step 6 of generating a noise profile that uses a signal sequence that generates no correlation with signals transmitted between said mobile station and said plurality of specific base stations in said correlation calculation; and wherein said step 2 includes step 7 of obtaining a correlation matrix for said plurality of noise profiles to obtain a correlation matrix difference between each of said delay profiles and each of said noise profiles and still another step 8 of calculating said weight through eigen analysis for each of said correlation matrix differences.

5. The method for wireless position location according to claim 4;

wherein said plurality of noise profiles are used to generate a plurality of fixed length profiles and one correlation matrix is generated from a plurality of noise profiles.

6. The method for wireless position location according to claim 2;
   wherein said step 1 includes another step 6 of generating a noise profile that uses a signal sequence that generates no correlation with signals transmitted between said mobile station and said plurality of specific base stations in said correlation calculation; and
   wherein said step 2 includes another step 7 of obtaining a correlation matrix between said plurality of noise profiles to obtain a correlation matrix difference between each of said delay profiles and each of said noise profiles and step 9 of whiting each eigen vector obtained through eigen analysis of each correlation matrix difference obtained in said step 7 with the correlation matrix of each of said noise profiles to calculate said weight.

7. The method for wireless position location according to claim 3;
   wherein said step 5 includes step 10 of combining said plurality of delay profiles with a weight with use of a plurality of eigen vectors generated through said eigen analysis to select an eigen vector having the maximum ratio of the maximum peak obtained as a result of said weighted combination to the average noise level so as to be used for said weighted combination.

8. The method for wireless position location according to claim 7;
   wherein said step 1 includes step 6 of generating a noise profile that uses a signal sequence having a phase different from any of the signals transmitted between said mobile station and said plurality of specific base stations; and
   wherein estimation of said average noise level in said step 10 is done with use of a value obtained by averaging combined noise profiles generated through weighted combination of said plurality of generated noise profiles with use of said plurality of eigen vectors at a sampling point in each profile or value obtained by multiplying the correlation matrix between said noise profiles by said plurality of eigen vectors.

9. The method for wireless position location according to claim 3;
   an eigen vector corresponding to the maximum eigen value is selected from among a plurality of eigen values and eigen vectors calculated from said correlation matrixes in said weight calculation in said step 2.

10. The method for wireless position location according to claim 1;
    wherein said transmitted signals are cycle T cycle signals; and
    wherein said step 2 includes another step 11 of selecting a plurality of delay profiles corresponding to a snapshot having the nearest observed timing from said plurality of delay profiles to adjust the phase rotations of said plurality of selected delay profiles, thereby summing up those selected delay profiles.

11. The method for wireless position location according to claim 1;
    wherein a plurality of base stations to be used are divided into a plurality of groups and each of the groups is subjected to the processings in steps 1, 2, and 3 to obtain one snapshot.

12. The method for wireless position location according to claim 1;
    wherein a complex weight is used for said weighted combination.

13. The method for wireless position location according to claim 1;
    wherein each of said transmitted signals includes a plurality of signal components transmitted through different propagation paths; and
    wherein said weighted combination is done by estimating a propagation path of a specific one of said plurality of signal components for each snapshot, compensating each delay profile according to said estimated propagation path, and generating a combined delay profile that highlights said specific signal component.

14. The method for wireless position location according to claim 1;
    wherein each of said transmitted signals includes a plurality of signal components transmitted through different propagation paths; and
    wherein said weighted combination is done by compensating the phase of each delay profile according to the phase difference between snapshots related to said specific one of said plurality of signal components.

15. The method for wireless position location according to claim 1;
    wherein each of said transmitted signals includes a plurality of signal components transmitted through different propagation paths; and
    wherein said weighted combination is a coherent summation about said specific one of said plurality of signal components.

16. A method for wireless position location with use of signals transmitted between a mobile station and a plurality of base stations, said method comprising:
    a step of generating a plurality of delay profiles corresponding to a plurality of signals transmitted between said mobile station and a plurality of specific base stations included in said plurality of base stations according to a plurality of snapshots each periodically taken from said transmitted signals at a plurality of time points separated by a time period D;
    a step of detecting path timings of said signals corresponding to said plurality of specific base stations from among said generated profiles; and
    a step of calculating a position of said mobile station according to said path timings detected with respect to said plurality of specific base stations,
    wherein each of said transmitted signals is a cyclical signal with a cycle T and said certain period D is shorter than said cycle, and
    wherein the relative timing for taking each of said plurality of snapshots with respect to said cycle T differs among said plurality of specific base stations.

17. The method for wireless position location according to claim 16;
    wherein the relative period with respect to said cycle T in each certain period D corresponding to each of said plurality of specific base stations does not overlap.

18. A mobile station for locating its position according to path timings of radio signals transmitted between said mobile station and a plurality of base stations, said mobile station comprising.
    means for transmitting radio signals between said mobile station and a plurality of base stations;
    a correlator for generating delay profiles by calculating results of correlation operations with specific signals corresponding to specific base stations in a plurality of snapshots taken out periodically at a plurality of time points from said transmitted radio signals;

memory means for storing said generated delay profiles;

profile combining means for combining said stored delay profiles with a respective weight to generate a combined delay profile for each of said plurality of specific base stations; and path detecting means for detecting path timings of said signals corresponding to said specific base stations according to said combined delay profile.

* * * * *